under 35
U.S.C. 154(b) by 320 days.

(12) United States Patent
Sharifi Mehr et al.

(10) Patent No.: US 10,382,461 B1
(45) Date of Patent: Aug. 13, 2019

(54) SYSTEM FOR DETERMINING ANOMALIES ASSOCIATED WITH A REQUEST

(71) Applicant: AMAZON TECHNOLOGIES, INC., Seattle, WA (US)

(72) Inventors: Nima Sharifi Mehr, Vancouver (CA); Dominique Imjya Brezinski, Palm Springs, CA (US); Sunu Aby Mathew, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 320 days.

(21) Appl. No.: 15/165,221

(22) Filed: May 26, 2016

(51) Int. Cl.
*H04L 29/06* (2006.01)

(52) U.S. Cl.
CPC .................. *H04L 63/1425* (2013.01)

(58) Field of Classification Search
CPC .................. H04L 63/1416; H04L 63/1425
See application file for complete search history.

(56) References Cited

U.S. PATENT DOCUMENTS

| | | | | |
|---|---|---|---|---|
| 8,151,341 | B1* | 4/2012 | Gudov | H04L 63/1408 726/13 |
| 8,490,195 | B1* | 7/2013 | Chen | G06F 21/725 705/51 |
| 9,043,942 | B1* | 5/2015 | Birdwell Rockson | G06F 21/60 726/28 |
| 9,071,576 | B1* | 6/2015 | Earl | H04L 63/0236 |
| 9,529,999 | B2* | 12/2016 | Fu | G06F 21/552 |
| 9,537,886 | B1* | 1/2017 | Gareau | H04L 63/1441 |
| 10,044,729 | B1* | 8/2018 | Astakhova | H04L 63/105 |
| 10,158,658 | B1* | 12/2018 | Sharifi Mehr | H04L 63/1425 |
| 2007/0186282 | A1* | 8/2007 | Jenkins | H04L 63/1416 726/22 |
| 2009/0164632 | A1* | 6/2009 | Kumar | H04L 67/2819 709/225 |
| 2010/0211694 | A1* | 8/2010 | Razmov | H04L 67/22 709/242 |
| 2011/0238838 | A1* | 9/2011 | Avalani | G06F 9/5011 709/226 |
| 2012/0151559 | A1* | 6/2012 | Koudys | G06F 21/316 726/3 |
| 2012/0233656 | A1* | 9/2012 | Rieschick | H04L 63/1441 726/1 |
| 2013/0212603 | A1* | 8/2013 | Cooke | G06F 9/542 719/328 |

(Continued)

*Primary Examiner* — Hee K Song
(74) *Attorney, Agent, or Firm* — Lindauer Law, PLLC.

(57) ABSTRACT

Described are techniques for identifying anomalous and non-anomalous requests based on metric values determined from a request. Weights to be associated with particular metric values may be determined based on metric data for those values. The metric data may indicate a total number of accesses by requests having a particular metric value, a frequency of access, or particular access times. Based on the weight values and the metric values for the request, a security score for the request may be determined. The security score may indicate a confidence that the request is anomalous or non-anomalous. Potentially anomalous requests may be determined to be non-anomalous if the metric values correspond to known sets of metric values, determined from previous requests. In some cases, metric data may be normalized prior to use to facilitate faster queries and conserve available data storage.

20 Claims, 10 Drawing Sheets

(56) References Cited

U.S. PATENT DOCUMENTS

| | | | |
|---|---|---|---|
| 2014/0304797 A1* | 10/2014 | Fu ..................... | H04L 63/0823 726/10 |
| 2015/0095978 A1* | 4/2015 | Lai ..................... | G06F 21/44 726/2 |
| 2015/0180863 A1* | 6/2015 | Kobayashi .............. | H04L 47/70 726/9 |
| 2015/0269377 A1* | 9/2015 | Gaddipati ............... | G06F 21/44 726/30 |
| 2016/0261465 A1* | 9/2016 | Gupta ................. | H04L 12/2816 |
| 2017/0126709 A1* | 5/2017 | Baradaran ........... | H04L 63/1416 |
| 2017/0155652 A1* | 6/2017 | Most .................. | H04L 43/0876 |

* cited by examiner

SYSTEM FOR DETERMINING ANOMALIES ASSOCIATED WITH A REQUEST

BACKGROUND

When a request to access a service is received, different characteristics of the request may be compared to expected values to identify abnormalities, such as errors or potentially malicious attacks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
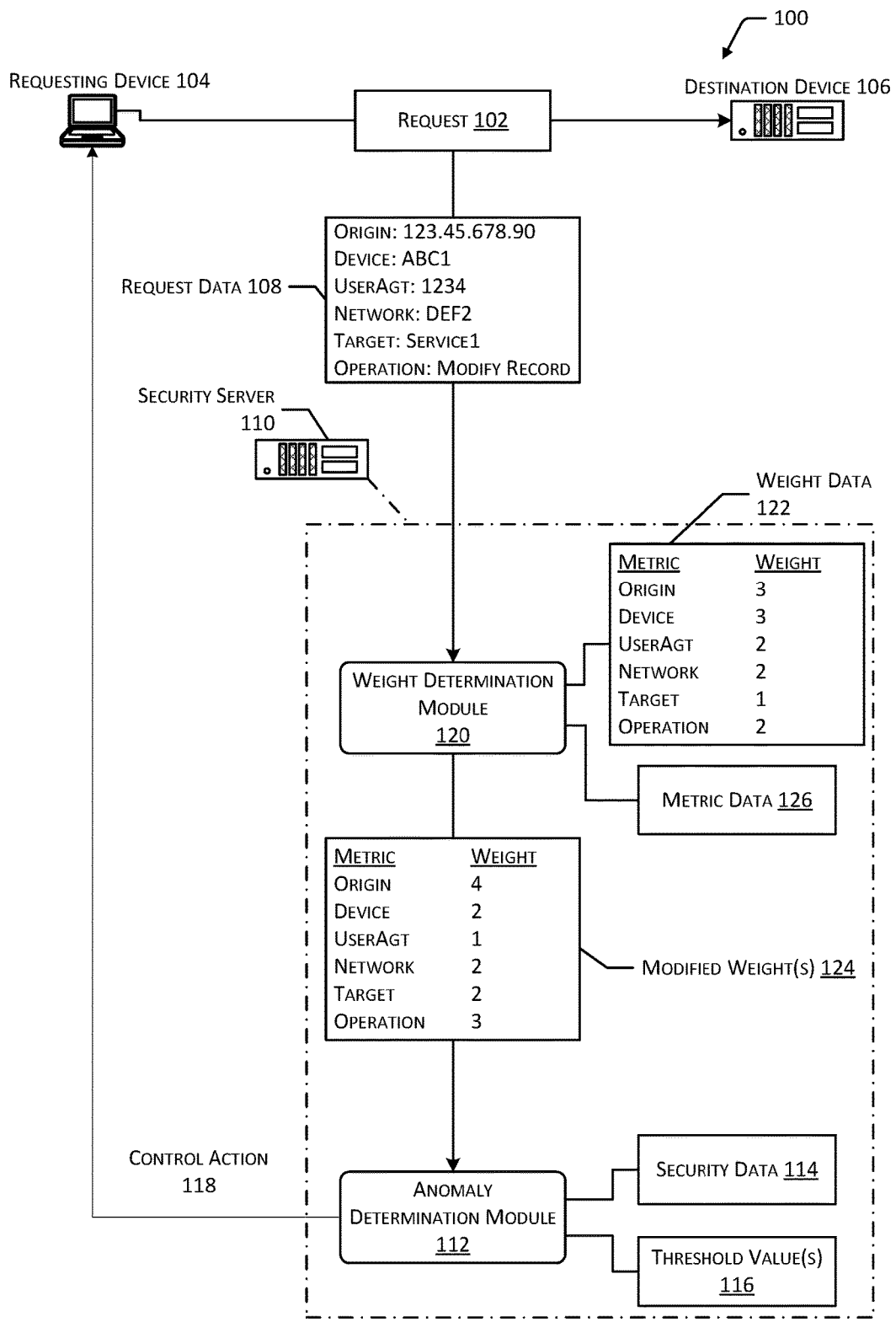
FIG. 1 depicts a system for determining weights to apply to metric values of a request to determine whether the request is anomalous.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A request to access a particular service may include one or more abnormalities, such as an error, a malicious attack, or other types of anomalous data. Abnormalities associated with a request may be identified based on various characteristics of the request. For example, a request or other data received over a network may include various packet types, packet sizes or lengths, field types, field values, field sizes, orders or arrangements of fields, extension types, record types, orders or arrangements of records, application or user agents used, and so forth. A request may be associated with a particular device, service, or user account. A request may be associated with a particular location of origin, such as a country, region, or city. In some cases, a location of origin for a request may be indicated by a network identifier, such as an Internet Protocol (IP) address. Requests may also be associated with particular communication channels or networks. For example, a request may be differentiated from other requests based on whether the request is provided using a trusted network or an untrusted network. Requests may also be differentiated from other requests by the specific service or other device targeted by the request or the specific operation to be performed responsive to the request.

Over time, the characteristics of non-anomalous requests may be observed and used to generate a profile of expected request characteristics. If one or more characteristics of a subsequent request deviate from the expected characteristics by more than a threshold value, this deviation may indicate that the request is anomalous. However, in many cases, the characteristics of a request may deviate from expected values for legitimate reasons, such as use of a different user agent by a requesting device. A single deviation may cause other related deviations. For example, a change in user agent may also result in a change in one or more networks or devices used to provide a request, a change in the format or content of the packets transmitted as part of the request, and so forth. The presence of a legitimate change may therefore result in a non-anomalous request being incorrectly identified as anomalous. Conversely, an anomalous request, such as a malicious attack, may appear substantially identical to a non-anomalous request, but may be provided from a different country of origin. This single change to one request characteristic may be insufficient to determine that the request is anomalous.

Described in this disclosure are techniques for accurately identifying anomalous requests that may otherwise be determined as non-anomalous, while also reducing incorrect identifications of non-anomalous requests as anomalous. When a request to access a service is received, one or more metric values indicative of the characteristics of the request may be determined. The metric value(s) may include an origin location associated with the request, such as an IP address or a geographical location (e.g., country, region, city, etc.) from which the request was received or at which the request was generated. The metric value(s) may further include an indication of the device, account, or service providing the request, one or more networks from which the request originated or through which the request was provided, or the user agent(s) used to request access to a service. The metric value(s) may also include an indication of the service or device targeted by the request or an indication of the operation to be performed by the service.

At least a subset of the metric values may include a weight associated therewith. For example, user input may be used to provide weight data, indicative of a weight associated with particular metric values based on the importance of the particular metric values for determining anomalous requests. Continuing the example, a request received from a different user agent than previous requests may be less likely to be anomalous than a request received from a different country of origin. Therefore, user input may assign a larger weight to metric values associated with the origin location of a request and a smaller weight to metric values for the user agent(s) associated with the request. In some implementations, the weights associated with metric values may include preset or default values or values determined by previous requests. For example, if a large percentage of requests for a specific service are provided by the same devices, metric values associated with the devices providing the request may be provided with a large weight. Continuing the example, if requests for the specific service are received using a large number of different user agents, metric values associated with user agents may be provided with a small weight.

The initial weight associated with the metric value(s) may be modified based on one or more dynamic factors. For example, the frequency of requests associated with a particular metric value, received over a period of time (e.g., 30 days or another length of time), may be used to increase or decrease the initial weight associated with the metric value. Continuing the example, if the rate at which requests having a particular metric value are received exceeds a threshold rate, the weight associated with the metric value may be increased, such that a deviation from the particular metric value may be more likely to indicate an anomalous request. Conversely, if the rate at which requests having the particular metric value is less than a threshold rate, the weight associated with the metric value may be decreased, such that a deviation from the particular metric value may be less likely to indicate an anomalous request. As another example, the time at which a previous request associated with a metric value is received may affect the weight provided to that metric value. Continuing the example, a metric value that was received more recently may be provided with a greater weight than a metric value that has not been observed for a greater length of time. As yet another example, a count of requests associated with a particular metric value may affect the weight provided to that metric value. Continuing the example, if the number of instances that a request having a particular metric value is received during a time period exceeds a threshold value, the weight associated with that metric value may be increased. If the number of instances of a request having the particular metric value is less than a threshold value, the weight for that metric value may be decreased. As another example, the ratio of the count of requests for a particular metric value to a total count of requests for a service (e.g., a percentage of total requests that include the particular metric value) may affect the weight provided to that metric value. Continuing the example, a greater percentage of requests, in excess of a threshold value may cause the weight for the metric value to be increased, while a percentage of requests less than a threshold value may cause the weight for the metric value to be decreased.

The length of the period of time over which the factors used to modify the weights for the metric value(s) may include a preset length, such as 30 days. In other implementations, user input may be used to select the period of time. In still other implementations, the length of the period of time may dynamically vary based on the number of requests received during a time period, such that the time period includes a selected number of requests. Different time periods may be used in association with different metric values. Use of a dynamic period of time may enable the weights provided to one or more of the metric values to automatically vary, based on requests that have been received during particular time periods.

Based on the determined metric value(s) for a request and the modified weights associated with the metric value(s), a security value, such as a score, associated with the request may be determined. The security value may indicate a likelihood (e.g., a confidence value) that the request is anomalous. Correspondence between the security value and one or more threshold security values may be used to determine a particular control action to be undertaken with regard to a request. For example, if a request is determined to be non-anomalous, the control action may include logging the occurrence of the request. If the request is determined to be anomalous, the control action may include generating one or more notifications, preventing access to a service, modifying, revoking, or replacing access credentials associated with the request, and so forth. In some implementations, the threshold security value may be determined based on previous security values associated with previous requests. For example, the security values associated with requests for a particular service over a selected period of time, such as 30 days, may be used to determine a time-series, a mean, or another value or set of values indicative of previously-determined security values. If the security value for a current request deviates from the time-series or other value determined from the previous security values by more than a threshold value, this deviation may indicate an anomalous request.

In some implementations, if metric values indicating a potentially anomalous request are determined, correspondence between the metric values and deviation data, indicating sets of metric values associated with previous non-anomalous requests may be determined. For example, a particular type of request may normally be received using a particular user agent over a particular set of networks. If a user provides the request using a different device, the user agent, networks, and location of origin associated with the request may differ, while other metric values for the request may not. The deviation data may include a set of metric values associated with a differing user agent, network, and location of origin. If all three of these metric values for a current request deviate from the expected metric values in a manner that corresponds to the deviation data, this may indicate that the request is non-anomalous. However, if the metric values for the current request deviate in a manner that does not correspond to the deviation data, the request may be anomalous. In some implementations, correspondence with the deviation data may be used to affect the control action taken with regard to a potentially anomalous request. In other implementations, correspondence with the deviation data may be used to affect the weight associated with one or more metric values. For example, if the user agent, network, and location of origin for a request each deviate in a manner that correspond to the deviation data, the weight associated with each of these metric values may be decreased, such that the deviation does not result in an indication of an anomaly.

In some implementations, metric values determined from a request may be normalized to conserve data storage and facilitate more efficient access to stored data. For example, requests to access a service may originate from a very large number of IP addresses. If each IP address associated with a request were stored in a database, storage of these metric values may consume a large quantity of data storage. Additionally, subsequent operations to query the database to determine the presence or absence of a particular IP address may become time-intensive and inefficient. However, if each IP address were normalized to indicate the country from which the request originated, the requests to access a service may originate from a limited number of countries. Storage of identifiers associated with these countries may consume a smaller amount of data storage and enable more efficient operations to query the database and locate the presence or absence of particular countries. In other implementations, an IP address may be normalized to indicate a region, state, or city associated with a request, an internet service provider (ISP) associated with the request, one or more particular networks associated with a request, and so forth. Other metric values may be normalized in a similar manner. For example, requests to access a service may utilize a large number of user agents. Normalization of metric values indicating the user agents may include removing version information associated with the user agents or normalizing the metric values to indicate the particular type or category associated with a user agent rather than the specific user agent used. In some implementations, a metric value may be normalized based on a number of records associated with the metric value. For example, if a data storage medium stores a number of IP addresses (e.g., three IP addresses) that is less than a threshold value (e.g., ten IP addresses), each of the IP addresses associated with the request may be stored individually in the data storage medium. However, if additional IP addresses are stored in the data storage medium, and the number of stored IP addresses exceeds the threshold value, subsequent IP addresses may be normalized to indicate a country or other region associated with the request.

The extent to which particular metric values may be normalized may be controlled using normalization data indicating a particular normalization scheme to apply or a particular portion of a metric value to be stored or discarded. In some implementations, normalization data may be determined based on user input. For example, a user may seek to minimize the costs associated with large quantities of data storage or improve the efficiency of accessing the data storage by providing a high level of normalization. Continuing the example, some implementations may include use of a Bloom filter or a counting filter, which may indicate the presence or absence of particular metric values, or a count of particular metric values, without necessarily retaining the metric values, themselves. Alternatively, a user may seek to maximize the accuracy for detecting anomalous requests at the expense of data storage and efficiency of access. In other implementations, the normalization data may be automatically or dynamically determined based on a quantity of data storage utilized, a number of records stored, a length of time used to query the data storage or access a record, and so forth.

FIG. 1 depicts a system 100 for determining weights to apply to metric values of a request 102, to determine whether the request 102 is anomalous. A requesting device 104 may provide a request 102 to a destination device 106 to access a service or one or more other resources (e.g., records, applications, etc.) associated with the destination device 106 or to perform another operation. The request 102 may also include data to be provided to the destination device 106, such as communications, records, or resources. The destination device 106 may, in turn, provide responses, other requests 102, or other data to the requesting device 104.

The request 102 may include various parameters and characteristics, illustrated as request data 108. For example, the request data 108 may include an indication of the origin location of the request 102, such as an IP address associated with the requesting device 104. The request data 108 may include one or more identifiers of a device, service, account, or other entity that generated or provided the request 102. The request data 108 may include an indication of a user agent used to generate or provide the request 102. The request data 108 may include an indication of one or more networks used to provide the request 102 to the destination device 106. The request data 108 may also include an indication of a particular service or other resource to be accessed (e.g., a target service or resource) and an indication of a particular operation to be performed or another result to be caused by the request 102, such as the modification of an existing data record. The request data 108 may additionally include characteristics associated with the content or purpose of the request 102, such as indications of packet types, packet sizes or lengths, packet contents, field types, field values, field sizes, orders or arrangements of fields, extension types, and so forth.

One or more security servers 110 may communicate with of the requesting device 104, the destination device 106, or one or more other intermediate devices associated with transmission of the request 102, to determine the request data 108 associated with the request 102. While FIG. 1 depicts a single security server 110, the security server 110 may include any number and any type of computing devices, such as mobile devices, set-top boxes, tablet computers, personal computers, wearable computers, servers, and so forth. Additionally, the requesting device 104 and the destination device 106 may also include any number or any type of computing devices including, without limitation, the types of computing devices described with regard to the security server 110. Furthermore, while FIG. 1 depicts the security server 110 as a separate computing device, in some implementations, the functions of the security server 110 may instead be performed by one or more services executing on one or more of the requesting device 104, the destination device 106, or one or more other computing devices in communication therewith.

The security server 110 may be configured to determine the likelihood that a request 102 is anomalous or non-anomalous, based on the request data 108, such as by calculating a security score or other type of confidence value indicative of the potential anomalous nature of the request 102. For example, an anomaly determination module 112 associated with the security server 110 may calculate a security score using at least a subset of the metric values included in the request data 108. The particular metric values used to calculate the security score may be determined based on user input, preexisting default values, or metric values determined based on request data 108 associated with previous requests 102. For example, if the IP address or country of origin associated with previous requests 102 has previously caused a large number of requests 102 to be determined as anomalous or non-anomalous, the IP address or country of origin may be used to calculate the security score. If the user agent associated with previous requests 102 has not caused a significant number of previous requests to be determined as anomalous or non-anomalous, the user agent may not necessarily be considered when determining the security score.

Security data 114 associated with the anomaly determination module 112 may include one or more rules, algorithms, and so forth, used to determine the security score based on one or more metric values. For example, the security data 114 may cause the anomaly determination module 112 to assign a first numerical score to requests 102 that originate in a first geographical region and a second, greater numerical score to requests 102 that originate in a second geographical region. As another example, the security data 114 may cause the anomaly determination module 112 to assign a first numerical score to requests 102 that are transmitted using a trusted network and a second, greater numerical score to requests 102 that are transmitted using an untrusted network. To determine the security score associated with a request 102, the anomaly determination module 112 may determine scores associated with multiple metric values, and one or more of the determined scores may be affected by a weight assigned to particular metric values.

Based on correspondence between the security score and one or more threshold values 116, the anomaly determination module 112 may cause a control action 118 to be taken with regard to the requesting device 104, the request 102, the destination device 106, or the security server 110. For example, if the request 102 is determined to be non-anomalous, the control action 118 may include storing the request data 108 associated with the non-anomalous request 102 for future querying and access. If the request 102 is determined to be potentially anomalous, the control action 118 may include denying the request 102, terminating one or more channels of communication associated with the requesting device 104, modifying, revoking, or replacing access credentials associated with the requesting device 104 or the destination device 106, and so forth. In some implementations, the threshold values 116 may include dynamic values determined using previous security scores. For example, the threshold values 116 may include a time-series generated based on security scores determined during a particular time period, such as the previous 30 days. Use of dynamic threshold values 116 may reduce the false identification of non-anomalous requests 102 as anomalous requests 102 if the characteristics of a request 102 change over time for legitimate reasons (e.g., concept drift). For example, if use of a particular user agent is discontinued, and subsequent requests 102 include a different user agent, use of threshold values 116 associated with the previous 30 days may prevent older data associated with an unused user agent from causing a request 102 to be identified as anomalous. As another example, if an entity relocates to a different geolocation or begins using a different requesting device 104, changes in IP addresses, device identifiers, networks used, and so forth may cause a request 102 to incorrectly be determined as anomalous if static threshold values 116 are used.

In some implementations, the weights associated with one or more of the metric values indicated by the request data 108 may be dynamic. For example, a weight determination module 120 associated with the security server 110 may determine one or more weights to be applied to at least a portion of the request data 108. The weight associated with a particular metric value may indicate the significance of a deviation of the particular metric value from an expected value (e.g., whether the deviation is likely to indicate an anomalous request 102). For example, a request 102 originating from an unexpected country may have a significant likelihood of being an anomalous request 102. Therefore, metric values associated with the origin location of the request 102 may be provided with a large weight. As another example, the user agent used to provide the request 102 may have little relevance regarding the anomalous or non-anomalous nature of the request 102. Therefore, metric values associated with the user agent may be provided with a small weight.

The weight determination module 120 may access weight data 122 indicative of an initial weight to be provided to particular metric values. The weight data 122 may be determined based on user input or preset default values. In some implementations, the weight data 122 may be determined based on previous requests 102 or previously-determined weights. For example, the weight data 122 may be dynamically updated as the weight determination module 120 modifies particular weights for particular metric values.

The weight determination module 120 may determine modified weights 124 for one or more of the metric values based on the initial weights indicated by the weight data 122 and metric data 126 associated with previous requests 102. The weight data 122 may also include one or more rules, algorithms, threshold values 116, and so forth, that may indicate the manner in which the modified weights 124 are determined. For example, the weight data 122 may include a rule indicating that if a particular metric value exceeds a particular threshold value 116, the modified weight 124 corresponding to that metric value may be determined by multiplying the initial weight for that metric value, indicated in the weight data 122, by a coefficient of 1.5 (e.g., such that the modified weight 124 is 50% greater than the initial weight). As another example, a rule may generate a modified weight 124 by increasing or decreasing an initial weight by a constant based on a particular metric value. As yet another example, a rule may generate modified weight 124 by increasing or decreasing an initial weight by a percentage, or a constant, based on the difference between a particular metric value and a corresponding threshold value 116.

The metric data 126 may include data indicative of previous request data 108 determined from previous requests 102, for one or more of the metric values of the request data 108. For example, the metric data 126 may include data regarding an access frequency associated with a particular metric value. Continuing the example, the metric data 126 may indicate that requests 102 originating from a particular IP address are typically received once per day. Metric values that are received more frequently may be provided with a greater modified weight 124 than metric values that are received less frequently. As another example, the metric data 126 may include data indicating times at which previous requests 102 including particular metric values were received. Continuing the example, metric values that were received more recently may be provided with a greater modified weight 124 than metric values that were received less recently. As yet another example, the metric data 126 may include data indicating a count of requests 102 that included a particular metric value. Continuing the example, metric values that were received a larger number of times within a preceding time period may be provided with a greater modified weight 124 than metric values received a smaller number of times during the preceding time period. The metric data 126 may also include data indicating a ratio or percentage of requests 102 that included a particular metric value, compared to a total count of requests 102 to access a resource. For example, metric values that were received for a greater portion of requests 102 may be provided with a greater modified weight 124 than metric values received for a smaller portion of requests 102.

In some implementations, the weight determination module 120 may generate the modified weights 124 using metric data 126 for a particular time period, such as the previous 30 days. Use of metric data 126 associated with a dynamic time period may enable the modified weights 124 associated with one or more of the metric values to vary based on a current status of the system 100. For example, in some cases, characteristics of a request 102 may change over time due to legitimate modifications to a requesting device 104, network, service, and so forth (e.g., concept drift). Use of metric data 126 from a dynamic time period may prevent metric data 126 that was determined a considerable time in the past from affecting the modified weights 124. Additionally, applying a greater modified weight 124 to metric values that occurred more recently or more frequently may reduce the effect of older metric data 126 on the resulting security determination.

Figure 2:
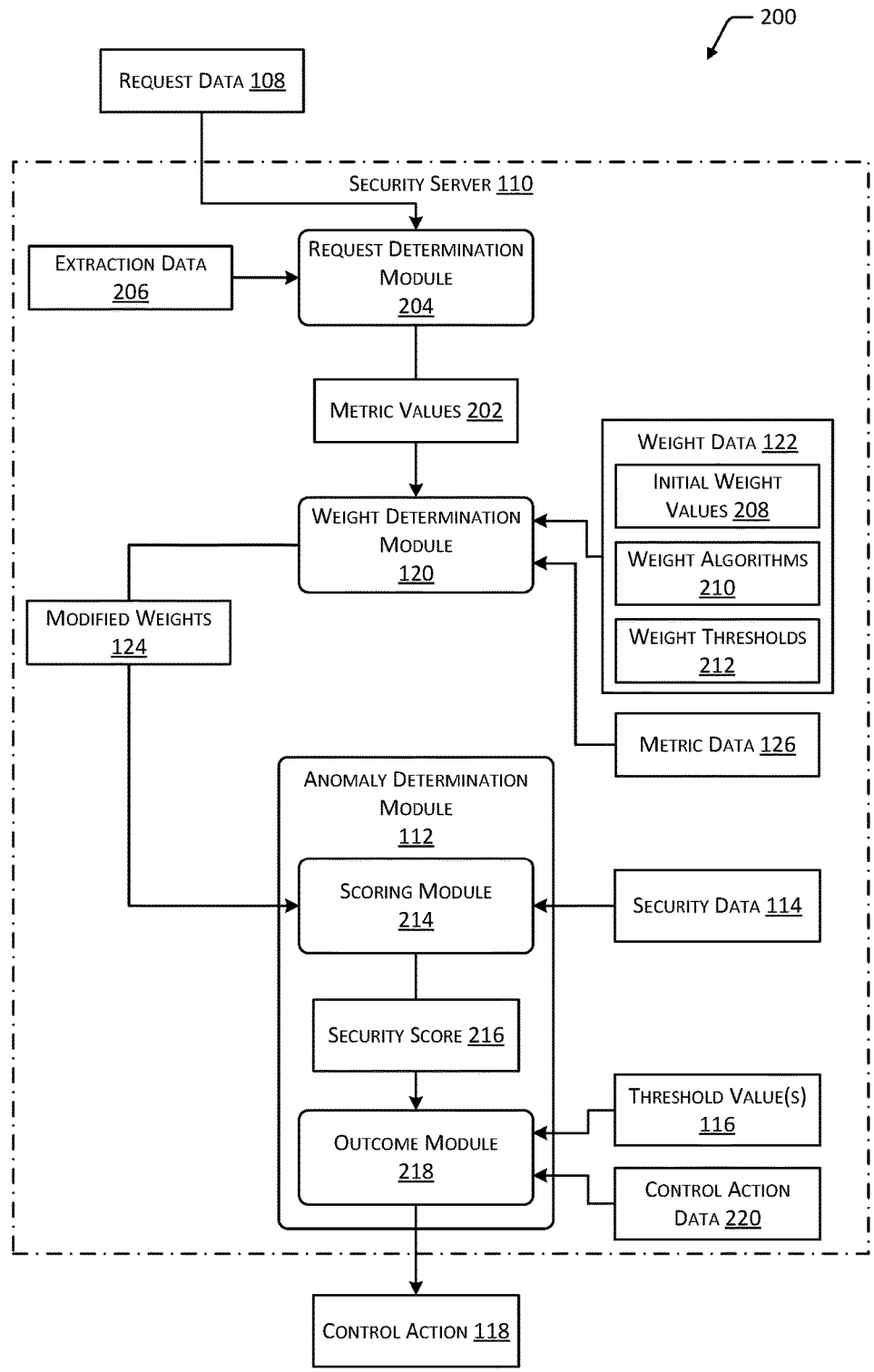
FIG. 2 depicts a system for determining control actions to be taken responsive to a request based on metric values determined from the request.

FIG. 2 depicts a system 200 for determining control actions 118 to be taken responsive to a request 102 based on metric values 202 determined from the request 102. As described with regard to FIG. 1, a security server 110 may determine request data 108 associated with a request 102 provided by a requesting device 104. The request data 108 may include one or more metric values 202 that may indicate a location, device, user agent, target, operation, or other characteristics associated with the request 102. In some implementations, only a portion of the request data 108 may be used to determine a particular control action 118 to undertake responsive to the request 102. For example, a request determination module 204 associated with the security server 110 may be configured to determine particular metric values 202 based on the request data 108. The request determination module 204 may access extraction data 206 indicative of the particular metric values 202 to be determined. The extraction data 206 may also include metadata, algorithms, and so forth, that may be used to determine the particular metric values 202 from a request 102. In some implementations, the extraction data 206 may also include one or more rules, algorithms, templates, mappings, or other data that may be used to modify or convert data extracted from a request 102 to a format that may be used by other modules of the security server 110. The extraction data 206 may be generated based on user input or preset default values. In some implementations, the extraction data 206 may be dynamically modified based on the modified weights 124 associated with particular metric values 202. For example, a particular metric value 202 that is provided with a modified weight 124 less than a threshold value 116 may not significantly affect whether a request 102 is determined to be anomalous. The particular metric value 202 may be removed from the extraction data 206. As another example, metric data 126 may indicate that requests 102 associated with a particular metric value 202 have been received a number of times or at a rate exceeding a threshold value 116. Based on this determination, the particular metric value 202 may be added to the extraction data 206.

The weight determination module 120 of the security server 110 may determine modified weights 124 to be associated with at least a subset of the metric values 202. The weight determination module 120 may access weight data 122, which may include one or more initial weight values 208 associated with one or more of the metric values 202. As described with regard to FIG. 1, initial weight values 208 for particular metric values 202 may be determined based on user input or preset default values. In some implementations, the initial weight value 208 for a metric value 202 may be dynamically varied based on the modified weights 124 previously associated with the metric value 202. The weight data 122 may also include one or more weight algorithms 210 and weight thresholds 212. The weight algorithms 210 may include one or more rules, processes, and so forth, that may be used to determine a modified weight 124 for a metric value 202 based on the metric data 126 associated with that metric value 202. For example, a weight algorithm 210 may include a rule indicating that if the frequency at which requests 102 including a particular metric value 202 were received during the preceding 30 days exceeds a corresponding weight threshold 212, the modified weight 124 for that metric value 202 may be determined by multiplying the initial weight value 208 for that metric value 202 by a coefficient of 1.5. As another example, weight algorithms 210 may include rules to determine modified weights 124 by increasing or decreasing initial weight values 208 by a constant. As yet another example, weight algorithms 210 may include rules to determine modified weights 124 based on the extent to which metric data 126 corresponds to or deviates from particular weight thresholds 212.

A scoring module 214, associated with the anomaly determination module 112, may determine a security score 216 based on the modified weights 124 and the metric values 202 for a request 102. The security module 214 may access security data 114 indicative of one or more rules, algorithms, and so forth, used to calculate the security score 216. In one example implementation, the security data 114 may include one or more rules to determine the security score 216 as a sum, difference, product, quotient, mean, or other quantifiable outcome, in which the metric values 202 are variables. The rules may use the modified weights 124 as coefficients for one or more of the metric values 202.

In some implementations, the weight determination module 120 may determine multiple modified weights 124 for one or more of the metric values 202. For example, the metric data 126 may indicate a number of instances that a request 102 including a particular metric value 202 was received on each day for the preceding 30 days. The weight determination module 120 may determine a modified weight 124 associated with each day on which the particular metric value 202 was observed. The rules or algorithms associated with the security data 114 may be configured to cause the scoring module 214 to determine the security score 216 based on each of the modified weights 124. In other implementations, the scoring module 214 may determine multiple security scores 216 associated with a particular request 102. For example, the scoring module 214 may determine different security scores 216 for a particular metric value 202 or set of metric values 202.

An outcome module 218 associated with the anomaly determination module 112 may determine one or more particular control actions 118 to undertake responsive to a request 102, based on the security score 216. For example, the outcome module 218 may be configured to determine correspondence between a determined security score 216 and one or more threshold values 116. The outcome module 218 may access control action data 220, which may indicate particular control actions 118 to be taken based on the extent to which a security score 216 corresponds to or deviates from a threshold value 116. The correspondence between a security score 216 and a threshold value 116 may indicate a likelihood that a particular request 102 is anomalous or non-anomalous. Based on the determination of the outcome module 218 with regard to the anomalous nature of the request 102, one or more control actions 118 may be performed responsive to a request 102. Control actions 118 responsive to anomalous requests 102 may include denial of the request 102, termination of one or more connections with the requesting device 104, modification of access credentials associated with the requesting device 104 or the destination device 106, generation of alerts or notifications, and so forth. Control actions 118 responsive to non-anomalous requests 102 may include logging or storage of the request data 108 associated with the request 102. For example, metric values 202 determined from a non-anomalous request 102 may be used to modify the metric data 126, which may in turn affect the modified weights 124 used to determine security scores 216 for subsequent requests 102.

Figure 3:
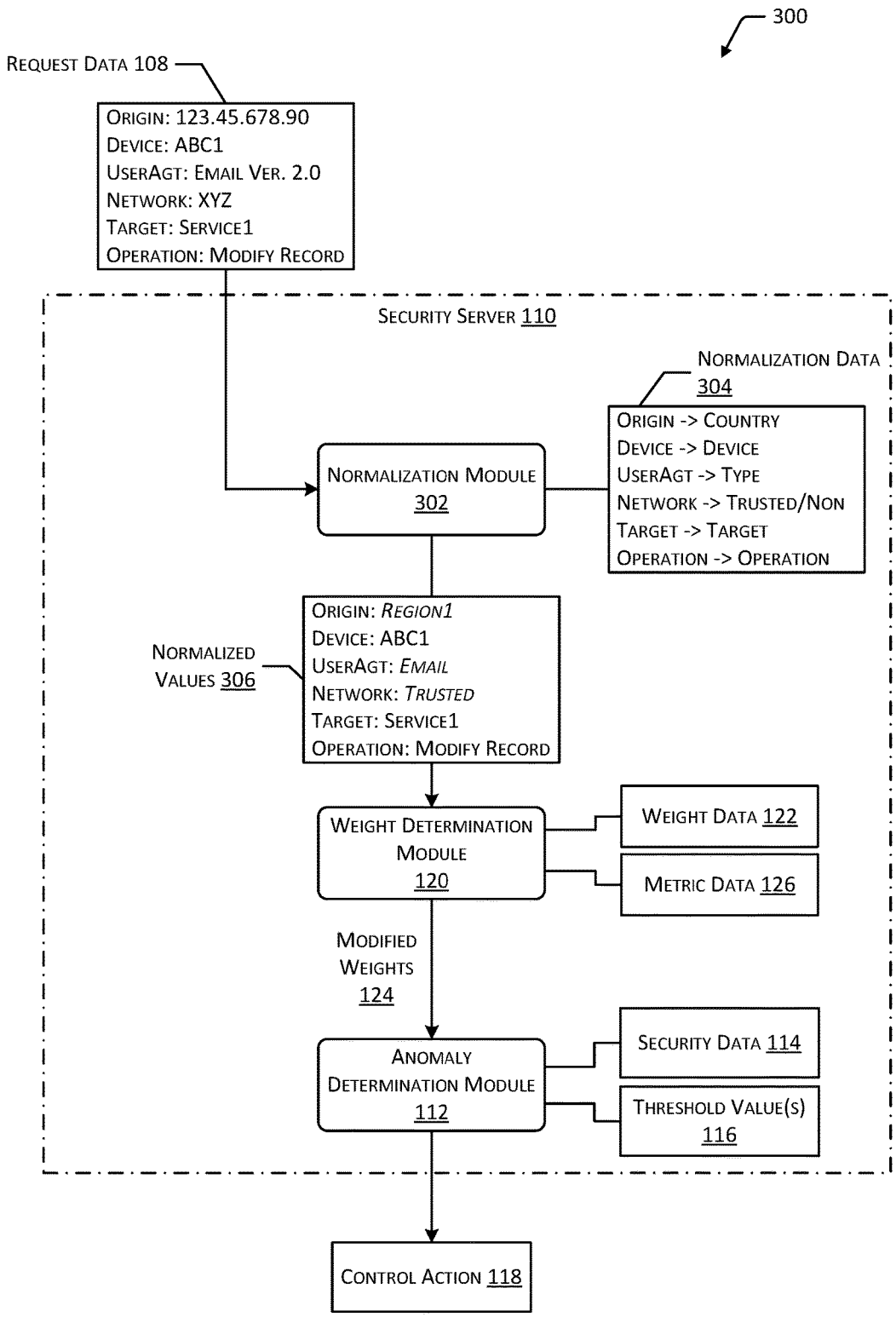
FIG. 3 depicts a system for normalizing request data used to determine the anomalous or non-anomalous nature of a request.

FIG. 3 depicts a system 300 for normalizing request data 108 used to determine the anomalous or non-anomalous nature of a request 102. As discussed with regard to FIGS. 1 and 2, request data 108 determined from a request 102 may include one or more characteristics of the request 102, such as metric values 202. For example, FIG. 3 depicts request data 108 including a metric value 202 indicating an origin location of the request 102, represented by an IP address (e.g., "Origin: 123.45.678.90"). The request data 108 is also shown indicating a metric value 202 identifying the requesting device 104 from which the request 102 was received (e.g., "Device: ABC1"). The request data 108 is further shown indicating a metric value 202 identifying the user agent used to provide the request 102 (e.g., "UserAgt: Email Ver. 2.0"). The request data 108 additionally indicates a metric value 202 identifying the network from which the request 102 was received (e.g., "Network: XYZ"). The request data 108 also indicates a metric value 202 identifying the service targeted by the request 102 (e.g., "Target: Service1"). The request data 108 is also shown indicating a metric value 202 indicative of the operation to be performed or caused by the request 102 (e.g., "Operation: Modify Record").

In some implementations, the security server 110 may be configured to normalize the request data 108 to reduce the quantity of data storage needed to store the request data 108 and decrease the time needed to query the data storage to determine the presence or absence of particular request data 108. For example, a very large number of IP addresses may be associated with requests 102 to access a service. A significant quantity of data storage may be needed to store each of the IP addresses, and subsequent queries to determine the presence or absence of particular IP addresses in the data store may require significant computational time and resources. Normalizing the IP addresses to indicate a finite set of records, such as the country of origin associated with each IP address, may significantly reduce the number of stored data records, which may increase the efficiency of accesses and queries to locate particular data records and reduce the quantity of data storage used to maintain the records.

A normalization module 302 associated with the security server 110 may access normalization data 304 indicative of the manner in which the request data 108 is to be normalized. For example, the normalization data 304 may indicate that metric values 202 associated with the location of origin for a request 102 are to be normalized to an indication of the country of origin. The normalization data 304 may indicate that metric values 202 associated with the particular requesting device 104, the service targeted by the request 102, and the operation to be caused by the request 102 may remain unchanged. The normalization data 304 may indicate that metric values 202 associated with the user agent used to provide the request 102 may be normalized to indicate the type of user agent used (e.g., while omitting version information). The normalization data 304 may also indicate that metric values 202 associated with the network(s) used to provide the request 102 may be normalized to indicate whether the request 102 was provided using a trusted or untrusted network. In some implementations, the normalization data 304 may also include one or more rules, algorithms, or mappings used to convert a metric value 202 to a normalized value 306. For example, the normalization data 304 may map IP addresses having particular groupings of numerals to corresponding alphanumeric indicators of countries, regions, states, or cities.

In some cases, the normalization module 302 may be used to modify the format of the request data 108 in a manner that is usable by other modules of the security server 110. For example, the normalization module 302 may be configured to add or remove spaces or punctuation from metric values 202, delete prefixes, suffixes, or version information from particular metric values 202, or map particular metric values 202 to corresponding alphanumeric values that may be used by other modules of the security server 110.

Based on the request data 108 and the normalization data 304, the normalization module 302 may generate normalized values 306. For example, FIG. 3 depicts the normalized values 306 including an indication of a country of origin (e.g., "Origin: Region1") in place of the IP address of the request data 108. The normalized values 306 also include an indication of a user agent type (e.g., "UserAgt: Email") in place of the user agent indicated in the request data 108. The normalized values 306 further include an indication of a trusted network (e.g., "Network: Trusted") in place of the network indicated in the request data 108.

In some implementations, normalization data 304 may be generated based on user input or preselected default values. In other implementations, the normalization data 304 may vary dynamically based on a currently used or free quantity of data storage, a current time used to access records stored in the data storage, and so forth. For example, if the time needed to query the data storage to locate a particular IP address exceeds a threshold time, the normalization data 304 may be modified such that IP addresses for subsequent requests 102 are normalized to indicate a city of origin. Subsequently, as additional data is stored, if the time needed to query the data storage to locate a particular city of origin exceeds the threshold time, subsequent requests 102 may be normalized to indicate a country of origin.

Subsequent to normalization of the request data 108, the weight determination module 120 may determine modified weights 124 based on metric values 202 determined from the normalized values 306, as described with regard to FIGS. 1 and 2. The anomaly determination module 112 may then determine a control action 118 to be taken based on the metric values 202, the security data 114, the threshold values 116, and the modified weights 124.

Figure 4:
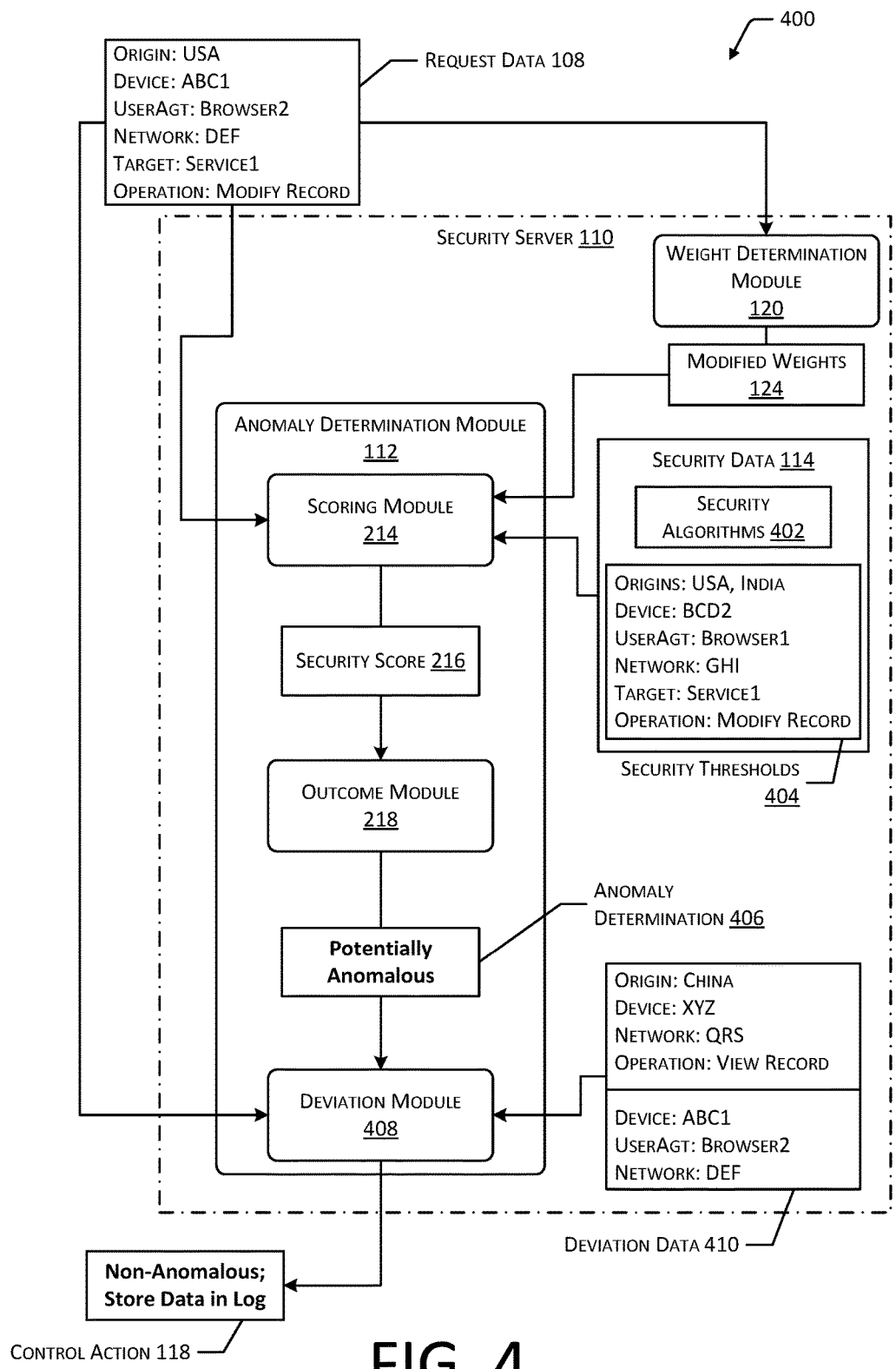
FIG. 4 depicts a system for determining legitimate deviations of request data from expected metric values.

FIG. 4 depicts a system 400 for determining legitimate deviations of request data 108 from expected metric values 202. Request data 108, determined from a request 102, provided by a requesting device 104, to a destination device 106, may indicate one or more metric values 202 associated with the request 102. For example, FIG. 4 depicts the request data 108 including a metric value 202 indicating a country of origin associated with the request 102 (e.g., "Origin: USA"). The depicted request data 108 also includes an indication of the requesting device 104 (e.g., "Device: ABC1"), the user agent used to provide the request 102 (e.g., "UserAgt: Browser2"), the network used to provide the request 102 (e.g., "Network: DEF"), the service targeted by the request 102 (e.g., "Target: Service1"), and the operation to be caused by the request (e.g., "Operation: Modify Record").

As described with regard to FIGS. 1-3, a weight determination module 120 associated with the security server 110 may determine modified weights 124 to be used, in conjunction with one or more of the metric values 202, to determine a security score 216 associated with the request 102. A scoring module 214 associated with the anomaly determination module 112 may determine the security score 216 based on the request data 108 and the modified weights 124. For example, the scoring module 214 may access security data 114, which may include one or more security algorithms 402 indicative of the manner in which the security score 216 may be determined using the request data 108 and modified weights 124. Continuing the example, a security algorithm 402 may include variables for one or more metric values 202, and coefficients for the variables that include one or more of the modified weights 124. As another example, a security algorithm 402 may include one or more numerical values that correspond to differences between a metric value 202 and a corresponding security threshold 404. For example, if the request data 108 includes a metric value 202 for a user agent that differs from a security threshold 404, the security data 114 may indicate that this difference corresponds to a security score 216 of "1" if a user agent having the same type but a different version is used, and a security score 216 of "2" if a user agent having a different type is used. Continuing the example, if a user agent is upgraded to a later version, or if an earlier version of an expected user agent is used, this may be less likely to indicate an anomaly than use of a different user agent. As another example, if the request data 108 includes a metric value 202 for an origin location that differs from a security threshold 404, the security data 114 may indicate that this difference corresponds to a security score 216 of "2" if the origin location includes a different IP address, and a security score 216 of "4" if the difference corresponds to a different country of origin.

The security thresholds 404 may therefore include indications of one or more expected metric values 202 that may indicate a non-anomalous request 102. Deviations from the expected metric values 202, by a current request 102, may indicate a likelihood that the request 102 is anomalous. The security score 216 determined by the anomaly determination module 112 may represent the likelihood that the request 102 is anomalous. For example, FIG. 4 depicts the security thresholds 404 indicating example metric values 202 for locations of origin (e.g., "Origins: USA, India"), user devices (e.g., "Device: BCD2"), user agents (e.g., "UserAgt: Browser1"), networks (e.g., "Network: GHI"), target services (e.g., "Target: Service1"), and operations (e.g., "Operation: Modify Record"). In the depicted example, the location, target service, and operation of the request data 108 would match those indicated by the security thresholds 404. However, the device, user agent, and network of the request data 108 would not match the example security thresholds 404.

Based on the security score 216 determined by the scoring module 214, an outcome module 218 associated with the anomaly determination module 112 may generate an anomaly determination 406 indicative of the anomalous or non-anomalous nature of the request 102. For example, the depicted request data 108 was determined from a request 102 generated by a requesting device 104 not indicated in the security data 114, using a user agent not indicated in the security data 114, and transmitted using a network not indicated in the security data 114. Based on these deviations from the security data 114, the anomaly determination 406 may indicate that the request 102 is potentially anomalous.

In some cases, particular differences or sets of differences between request data 108 and security data 114 may be determined to be acceptable deviations, not indicative of anomalous requests 102. For example, a deviation module 408, associated with the anomaly determination module 112, may be configured to determine whether the request data 108 for a current request corresponds to deviation data 410 indicative of sets (e.g., clusters) of differences that may simultaneously occur due to legitimate reasons. Continuing the example, the security thresholds 404 may indicate that non-anomalous requests 102 typically originate in the United States or India, are generated using requesting device 104 "BCD2" and network "GHI" for the purpose of modifying a particular data record. However, a user travelling in China may be provided with sufficient access to view data records. While accessing the data records from China, the user may use a different requesting device 104 (e.g., "Device: XYZ"), which would access the records using a different network (e.g., "Network: QRS"), to perform a different operation (e.g., "Operation: View Record"). The deviation data 410 may therefore indicate a particular set of deviations for metric values 202 associated with the country of origin, network, target operation, and identity of the requesting device 104, that may indicate a non-anomalous request 102, independent of the differences between the request data 108 and the security thresholds 404.

As another example, a user may typically access a system 400 using a first requesting device 104, indicated in the security thresholds 404 (e.g., "Device: BCD2"). A request 102 provided using this requesting device 104 may be transmitted using a particular network (e.g., "Network: GHI") and a particular user agent (e.g., "Browser1"), also indicated in the security thresholds 404. However, when a legitimate user of the system 400 provides a request 102 using a different requesting device 104 (e.g., "Device: ABC1"), the different user device 104 may have a different user agent installed thereon (e.g., "UserAgt: Browser2") and may access the system 400 using a different network (e.g., "Network: DEF"). These three differences between the request data 108 for a request 102 and the security thresholds 404 may normally cause the request 102 to be determined as anomalous. However, the deviation data 410 may include a set of differences indicative of the second requesting device 104, user agent, and network. Based on the correspondence between the request data 108 and the deviation data 410, the deviation module 408 may determine that the request 102 is non-anomalous and generate a control action 118 associated with a non-anomalous request 102, such as logging the request data 108.

Figure 5:
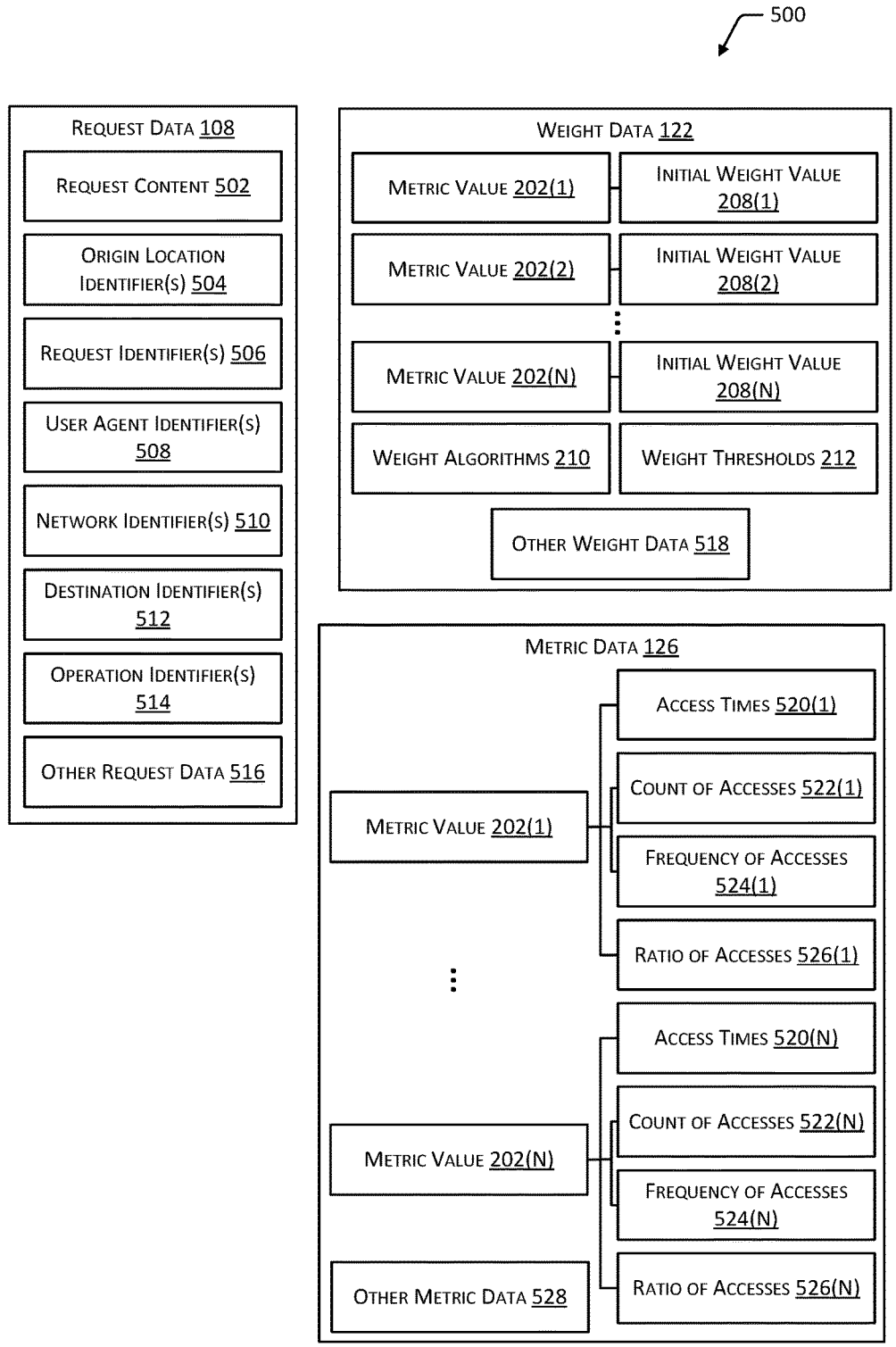
FIG. 5 is a series of block diagrams depicting example request data, weight data, and metric data.

FIG. 5 is a series of block diagrams 500 depicting example request data 108, weight data 122, and metric data 126. Request data 108 may include data determined from a request 102 generated by a requesting device 104 and provided to a destination device 106 to access a service or other resource. The request data 108 may be used to determine whether the request 102 is potentially anomalous and may indicate various metric values 202 and other characteristics of the request 102. For example, the request data 108 may include request content 502, such as particular types, sizes, and content of data packets provided via the request 102, particular field types, sizes, values, and arrangements associated with the request 102, types or arrangements of extensions associated with the request 102, and so forth. For example, a request 102 having packets of a length that deviates from an expected threshold length may be determined to be anomalous.

The request data 108 may also include one or more origin location identifiers 504. Origin location identifiers 504 may include data indicative of a location at which a request 102 was generated or provided. For example, an origin location identifier 504 may include an IP address or other type of network address, an indication of a city, state, region, country, or other geolocation associated with a requesting device 104, and so forth. In some implementations, an origin location identifier 504 may include an identifier associated with a requesting device 104, service, or account associated with the request 102 and mapping data that associates the identifier with a corresponding location. A request 102 originating from a location that deviates from an expected origin location may be determined to be anomalous.

The request data 108 may also include one or more request identifiers 506 indicative of the requesting device 104, a service or user account associated with the requesting device 104, or other data indicative of the entity associated with generating or providing the request 102. Request identifiers 506 may include alphanumeric data, such as device names, user account names, service names, and so forth. In some implementations, request identifiers 506 may include network addresses associated with requesting devices 104, such as a Media Access Control (MAC) address or IP address. For example, a request 102 originating from a device having a device identifier that deviates from expected request identifiers 506 may be determined to be anomalous.

The request data 108 may further include one or more user agent identifiers 508. User agent identifiers 508 may indicate particular applications, such as browsers, e-mail applications, and so forth, that may be used to access destination devices 106 and associated services on behalf of a user. The user agent identifiers 508 may indicate a name associated with a user agent, a type associated with the user agent (e.g., a browser), version information associated with a user agent, and so forth. For example, a request 102 provided using a user agent with an identifier that differs from an expected user agent identifier 508 indicated by a security threshold 404 may be determined to be anomalous.

The request data 108 may additionally include one or more network identifiers 510. Network identifiers 510 may indicate particular networks associated with the generation or transmission of a request 102. In some implementations, network identifiers 510 may indicate particular entities associated with a network. For example, some networks may include trusted networks or networks associated with trusted entities. In other implementations, network identifiers 510 may indicate particular security features associated with a network. For example, some networks may be known to be secure networks, while other networks may be unsecured. The secure or trusted nature of a network may be determined based on network identifiers 510 or other characteristics of the network. A request 102 provided using an unknown, untrusted, or unsecured network may be determined to be anomalous.

The request data 108 may include destination identifiers 512. Destination identifiers 512 may indicate a specific destination device 106, service, or other resource targeted by a request 102. For example, a request 102 seeking to access a resource not indicated in a security threshold 404 may be determined to be anomalous. The request data 108 may similarly include operation identifiers 514. Operation identifiers 514 may indicate the specific operations or results to be caused by the request 102, such as the addition, deletion, modification, or accessing of a particular data record. For example, a request 102 seeking to perform an operation not indicated in a security threshold 404 may be determined to be anomalous.

Other request data 516 may include metadata indicative of the author of a request 102, the time at which a request 102 was generated or provided, encryption or other security features associated with a request 102, and so forth. For example, requests 102 associated with unexpected authors, provided at unexpected times, or lacking expected security features may be determined to be anomalous.

Weight data 122 may associate initial weight values 208 with particular metric values 202. As described with regard to FIGS. 1-4, the initial weight values 208 may be modified, such as by the weight determination module 120, to generate modified weights 124 for determining the anomalous or non-anomalous nature of a request 102. For example, FIG. 5 depicts the weight data 122 including a first initial weight value 208(1) associated with a first metric value 202(1). For example, the first metric value 202(1) may include an origin location identifier 504, and the first initial weight value 208(1) may be "4". The weight data 122 is also shown including a second initial weight value 208(2) associated with a second metric value 202(2). For example, the second metric value 202(2) may include a user agent identifier 508, and the second initial weight value 208(2) may be "1". Any number of additional metric values 202(N) may be stored in association with any number of additional initial weight values 208(N). The weight data 122 may include initial weight values 208 for all or a portion of the metric values 202 determined from a request 102, and in some implementations, the weight data 122 may include initial weight values 208 for additional metric values 202 that may not be determined from every request 102. The initial weight values 208 may be determined by one or more of user input, preset default values, or previously-determined modified weights 124.

The weight data 122 may also include weight algorithms 210 and weight thresholds 212. As described with regard to FIG. 3, weight algorithms 210 may include rules, processes, and so forth, used to determine a modified weight 124 for a metric value 202 based on an initial weight value 208 and the metric data 126 associated with that metric value 202. For example, a weight algorithm 210 may indicate that if a particular metric value 202 exceeds a corresponding weight threshold 212 by a first amount, the modified weight 124 may be determined by multiplying the initial weight value 208 by a first coefficient. The weight algorithm 210 may also indicate that if the particular metric value 202 exceeds the weight threshold 212 by a second, greater amount, the modified weight 124 may be determined by multiplying the initial weight value 208 by a second, greater coefficient.

Other weight data 518 may include user interface data used to receive initial weight values 208 from users, user profile data indicating initial weight values 208 to be used in conjunction with particular requesting devices 104, destination devices 106, or target services, and so forth. In some implementations, other weight data 518 may include algorithms for determining initial weight values 208 based on previously-determined modified weights 124 for a metric value 202.

Metric data 126 may associate particular metric values 202 with characteristics of that metric value 202 determined based on previous requests 102 for a particular time period. For example, the metric data 126 may indicate particular access times 520 during which a request 102 having a particular metric value 202 occurred. Continuing the example, the access times 520 may indicate that a request 102 associated with a particular origin location identifier 504 occurred each day of the preceding 30 days at 11:00 A.M. Coordinated Universal Time (UTC). The metric data 126 may indicate a count of accesses 522 that occurred during a particular time period for requests 102 having a particular metric value 202. For example, the count of accesses 522 may indicate that five hundred requests 102 originating in India were received during the preceding 30 days. The metric data 126 may further indicate a frequency of accesses 524 associated with a particular metric value 202. For example, the frequency of accesses 524 may indicate that requests 102 to access a particular target service (e.g., requests 102 having a particular destination identifier 512) were received with an average frequency of once per hour during the preceding 30 days. Metric data 126 may also indicate a ratio of accesses 526 associated with a particular metric value 202 to a total count of accesses 522. For example, a ratio of accesses 526 may indicate that sixty percent of the requests 102 of a total count of accesses 522, to access a particular service, received during the preceding 30 days, originated in the United States.

The metric data 126 for a particular metric value 202 may differ from the metric data 126 for other metric values 202. For example, FIG. 5 depicts a first metric value 202(1) associated with metric data 126 indicative of a first set of access times 520(1), a first count of accesses 522(1), a first frequency of accesses 524(1), and a first ratio of accesses 526(1). Any number of additional metric values 202(N) may be associated with any number of additional metric data 126, such as additional access times 520(N), counts of accesses 522(N), frequencies of accesses 524(N), and ratios of accesses 526(N). In some implementations, certain types of metric data 126 may be determined for particular metric values 202 while different types of metric data 126 may be determined for other metric values 202.

Other metric data 528 may include other characteristics associated with particular metric values 202, such as counts or frequencies of instances where a request 102 is rejected or determined to be anomalous based on a particular metric value 202. For example, other metric data 528 may include previous deviations of a metric value 202 from security thresholds 404. In some cases, requests 102 from a particular entity may be expected to deviate from security thresholds 404 with a certain frequency or by a certain amount. Deviations of particular metric values 202 that fall within expected frequencies or ranges indicated by the other metric data 528 may affect the modified weight 124 associated with the metric value 202. In some implementations, requests 102 that do not deviate in an expected manner indicated in the other metric data 528 may be determined to be anomalous. Other metric data 528 may also include user input data indicating particular types of metric data 126 to be determined for particular metric values 202.

Figure 6:
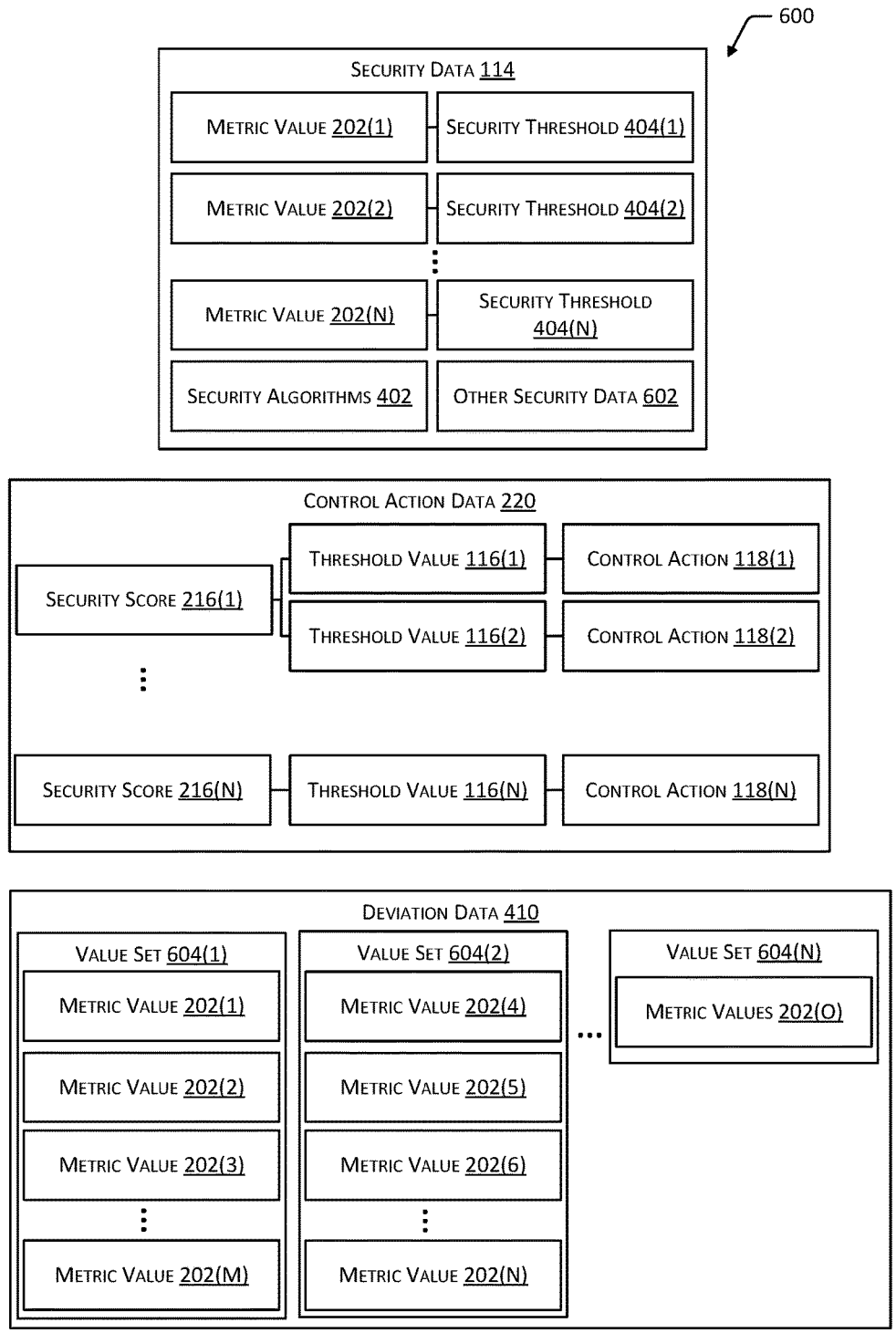
FIG. 6 is a series of block diagrams depicting example security data, control action data, and deviation data.

FIG. 6 is a series of block diagrams 600 depicting example security data 114, control action data 220, and deviation data 410. Security data 114 may be used to determine security scores 216 for requests 102, based on the metric values 202 determined for the requests 102, the modified weights 124 for the metric values 202, one or more security thresholds 404, and security algorithms 402 that indicate the manner in which a security score 216 is to be determined based on this information.

For example, the security data 114 may associate a first metric value 202(1) with a first security threshold 404(1), a second metric value 202(2) with a second security threshold 404(2), and any number of additional metric values 202(N) with any number of additional security thresholds 404(N). Continuing the example, the first metric value 202(1) may include an origin location identifier 504 for a request 102, such as an IP address, and the corresponding first security threshold 404(1) may include a list of IP addresses. A corresponding security algorithm 402 may indicate that a first score is to be assigned to the first metric value 202(1) if the IP address for the request 102 matches the security threshold 404(1), while a second score is to be assigned to the first metric value 202(1) if the IP address does not match the security threshold 404(1). For example, the first score may be a negative value, indicating a decreased likelihood of an anomaly, while the second score may be a positive value, indicating an increased likelihood of an anomaly. The score determined for the first metric value 202(1) may be modified based on the modified weight 124 associated with the first metric value 202(1). The security algorithms 402 may additionally indicate the manner in which scores for other metric values 202 are determined. The security algorithms 402 may additionally indicate the manner in which a total security score 216 for a request may be determined based on the scores for each individual metric value 202 of the request 102.

Other security data 602 may include algorithms for modifying security thresholds 404 based on previous metric values 202. For example, over time, a portion of requests 102 that originate from a newer version of a user agent may increase while requests 102 that originate from a previous version of the user agent may decrease. Responsive to these changes in the metric data 126, the security threshold 404 may be modified such that use of the newer version of the user agent does not significantly affect the security score 216 in a manner that indicates an anomaly.

Control action data 220 may be used to determine particular control actions 118 to be taken based on determined security scores 216. In some implementations, the control actions 118 may also be determined based on particular metric values 202. FIG. 6 depicts the control action data 220 including a first security score 216(1) stored in association with a first threshold value 116(1) and a second threshold value 116(2). For example, the first threshold value 116(1) may include a security score 216 of "20", while the second threshold value 116(2) includes a security score 216 of "40". A first control action 118(1) may be associated with the first threshold value 116(1), and a second control action 118(2) may be associated with the second threshold value 116(2). For example, if the first security score 216(1) exceeds the first threshold value 116(1) of "20", a first control action 118(1) may be performed, such as generating a notification indicative of a potential anomalous request 102 and storing the request data 108 in a log. If the first security score 216(1) exceeds the second threshold value 116(2) of "40", a second control action 118(2) may include rejecting the request 102 and invalidating the access credentials associated with the request 102. Any number of additional security scores 216(N) may be stored in association with additional threshold values 116(N) and control actions 118(N). In some implementations, threshold values 116 may include minimum threshold values 116, and a security score 216 less than a minimum threshold value 116 may be associated with control actions 118 relevant to non-anomalous requests 102. For example, a control action 118 may include storing the request data 108 for a non-anomalous request 102 and modifying the metric data 126 based on the request data 108. In some implementations, the threshold values 116 may vary dynamically, based on previously-determined security scores 216. For example, a threshold value 116 may include a mean, time-series, or other value derived from security scores 216 that were determined during a previous time period. Continuing the example, the control action 118 to be performed may be determined based on the amount by which a security score 216 deviates from a threshold value 116 derived from previous security scores 216 observed during the previous 30 days.

Deviation data 410 may be used to indicate sets of metric values 202 that may differ from expected security thresholds 404, but may indicate a non-anomalous request 102 when these differences occur simultaneously. For example, FIG. 6 depicts the deviation data 410 including a first value set 604(1) that may include a first metric value 202(1), a second metric value 202(2), a third metric value 202(3), and any number of additional metric values 202(M). Similarly, a second value set 604(2) may include a fourth metric value 202(4), a fifth metric value 202(5), a sixth metric value 202(6), and any number of additional metric values 202(N). The deviation data 410 may include any number of additional values sets 604(N), each of which may include any number of additional metric values 202(0). When each metric value 202 indicated in a value set 604 corresponds to metric values 202 of a current request 102, this correspondence may indicate that the request 102 is non-anomalous. For example, when a request 102 is received from a different requesting device 104, use of this different requesting device 104 may cause the request 102 to be provided using a different network and user agent. Therefore, a value set 604 may include metric values 202 corresponding to the differing requesting device 104, user agent, and network. If all three of these differing metric values 202 are determined in a request 102, this may indicate that the request is non-anomalous. If only one of the metric values 202 is determined in the request 102, the lack of correspondence between the request 102 and the deviation data 410 may facilitate the determination that the request 102 is anomalous. In other implementations, the deviation data 410 may include one or more deviation thresholds. For example, a request 102 may be determined to be non-anomalous if it corresponds to a threshold quantity or threshold portion of the metric values 202 contained within a value set 604.

Figure 7:
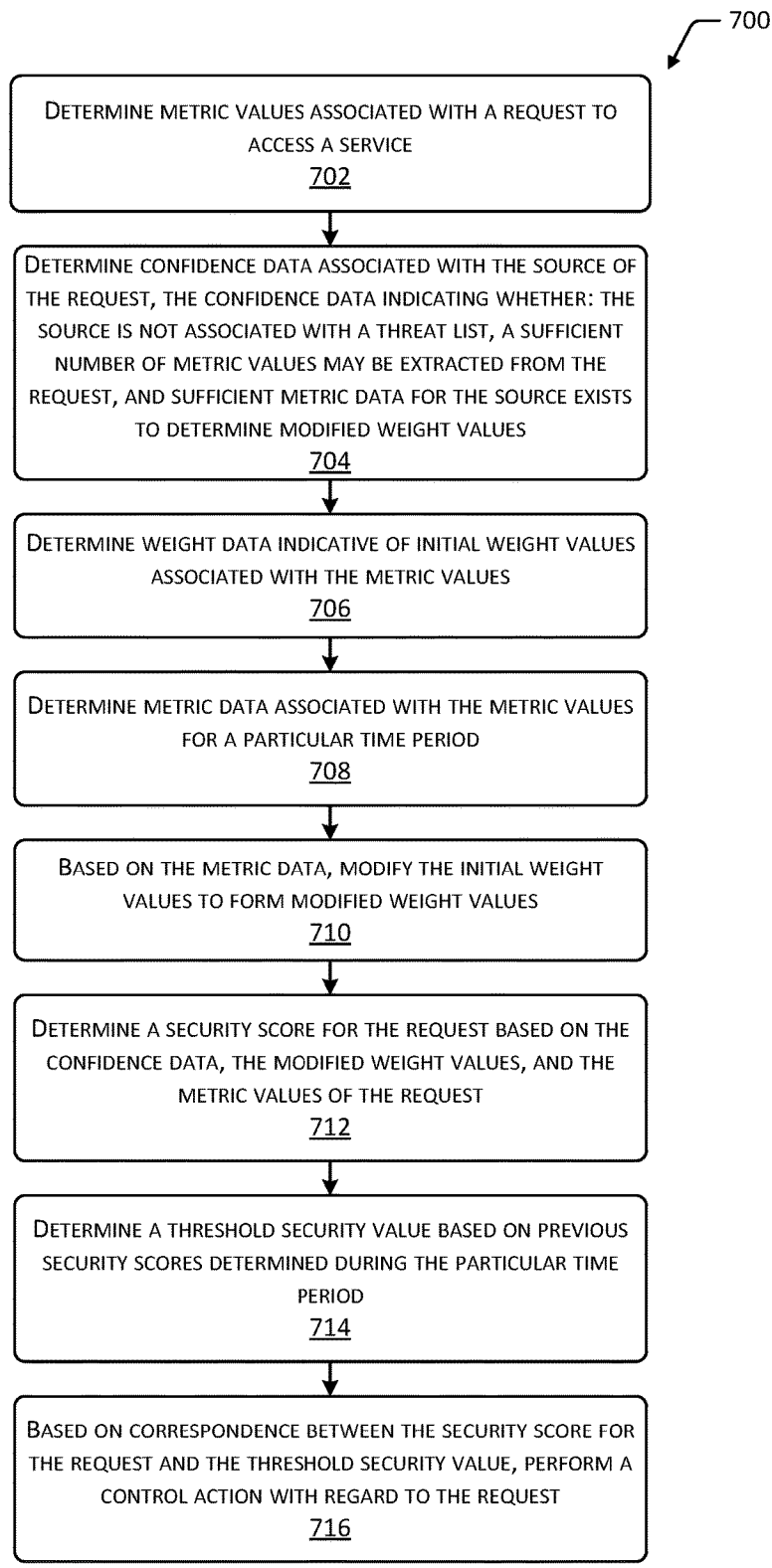
FIG. 7 is a flow diagram illustrating a method for determining metric values associated with a request, modified weights associated with the metric values, and a control action to be performed.

FIG. 7 is a flow diagram 700 illustrating a method for determining metric values 202 associated with a request 102, modified weights 124 associated with the metric values 102, and a control action 118 to be performed. Block 702 determines metric values 202 associated with a request 102 to access a service. A request 102 may include request data 108 indicative of various characteristics of the request 102. A request determination module 204, a weight determination module 120, or one or more other modules associated with the security server 110 may determine metric values 202 based on the request data 108. Metric values 202 may include indications of the location where the request 102 originated, the entity providing the request 102, networks through which the request 102 was provided, user agents associated with the request 102, services or devices targeted by the request 102, operations to be caused by the request 102, and so forth.

Block 704 determines confidence data associated with the source of the request 102. The confidence data may indicate whether or not the source is associated with a threat list or other source of threat data that may indicate the request 102 is anomalous, independent of the metric values 202 associated therewith. In some implementations, if the request 102 or a source of the request 102 corresponds to existing threat data, the request 102 may be determined to be anomalous without performing the steps indicated in blocks 706 through 716. The confidence data may also indicate whether a sufficient number of metric values 202 may be extracted from the request 102. For example, if a request 102 does not include an indication of the origin of the request 102 or if a metric value 202 associated with the origin is not able to be determined, determination of a security score 216 for the request 102 may not be possible. The confidence data may further indicate whether sufficient metric data 126 associated with the source exists to determine modified weight values 124 for the metric values 202. For example, if an entity associated with a request 102 has only recently begun to provide requests 102 to a destination device 106 within the preceding three days, the quantity of metric data 126 determined during the preceding three days may be insufficient to determine modified weights 124 for the metric values 202.

In some implementations, based on the confidence data, a request 102 may be determined to be anomalous independent of the metric values 202 associated therewith (e.g., without performing the steps indicated in blocks 706 through 716).

Block 706 determines weight data 122 indicative of initial weight values 208 associated with the metric values 202. For example, at least a subset of the metric values 202 may include corresponding weight data 122 indicating a qualitative or quantitative weight that may represent the importance of the metric value(s) 202 for determining the anomalous or non-anomalous nature of a request 102. Continuing the example, a metric value 202 indicating the origin location of the request 102 may have an initial weight value 208 of "4", while a metric value 202 indicating the user agent associated with the request 102 may have an initial weight value 208 of "1". In some implementations, weight data 122 may be determined based on user input or preselected default values. In other implementations, weight data 122 may be dynamically determined based on weights determined for metric values 202 for a selected time period.

Block 708 determines metric data 126 associated with the metric values 202 for a particular time period. Metric data 126 may include indications of times at which requests 102 having particular metric values 202 were received, counts of accesses 522, frequencies of accesses 524, and so forth. For example, metric data 126 may indicate that 1,274 requests 102 having a particular location of origin were received during the preceding 30 days. The metric data 126 may also indicate the particular access times 520 that each request 102 was received. Similar information regarding other metric values 202 may also be determined based on the metric data 126.

Block 710 modifies the initial weight values 208 for one or more metric values 202 based on the metric data 126, to form modified weights 124. For example, a metric value 202 that has been observed more recently than a particular threshold time, more frequently than a threshold frequency, or a greater number of times than a threshold count of times may be provided with a modified weight 124 greater than the initial weight value 208. Continuing the example, the initial weight value 208 may be increased by an amount proportional to the amount that the metric data 126 for a metric value 202 exceeds a corresponding threshold to determine the modified weight 124. In other implementations, the initial weight value 208 may be increased by a fixed amount if particular metric data 126 exceeds a threshold. In still other implementations, the initial weight value 208 may be decreased to form the modified weight 124, such as if the metric data 126 for a particular metric value 202 is less than one or more threshold values 116. In other implementations, the modified weight 124 may be zero or may include a negative weight. For example, the metric data 126 may indicate that a particular metric value 202 is not useful for determining the anomalous nature of a request 102, or that a deviation of a particular metric value 202 from an expected threshold may indicate a smaller likelihood of an anomaly.

Block 712 determines a security score 216 for the request 102 based on the confidence data, the modified weight 124, and the metric values 202 of the request 102. As described with regard to FIGS. 1-4, an anomaly determination module 112 associated with the security server 110 may determine correspondence between the metric values 202 and one or more security thresholds 404. One or more security algorithms 402 may indicate the manner in which the security score 216 is determined, based on the security thresholds 404, the metric values 202, and the modified weights 124. In some implementations, the security score 216 may include a numerical value. In other implementations, the security score 216 may include a qualitative value, such as an indication of the likelihood of an anomaly, expressed using one or more of text, images, or audio data.

Block 714 determines a threshold security value based on previous security scores 216 determined during the particular time period. For example, the threshold security value may include a time-series, a mean, or another mathematical value determined based on previous security scores 216 that were determined during the preceding 30 days, or another selected time period. Use of a dynamic threshold security value may enable variations in security scores 216 over time that occur due to legitimate reasons (e.g., concept drift) to be determined as non-anomalous requests.

Block 716 performs a control action 118 with regard to the request 102, based on correspondence between the security score 216 and the threshold security value. For example, if the security score 216 does not exceed a threshold security value, this may indicate that the request 102 is non-anomalous. Based on this determination, the control action 118 may include storing the request data 108 and modifying the metric data 126 based on the metric values 202 for the request 102. The threshold security value may also be modified based on the security score 216 for the non-anomalous request 102. If the security score 216 exceeds the threshold security value, this may indicate that the request 102 is potentially anomalous. Based on this determination, the control action 118 may include generation of notifications or alerts, rejection of the request 102, modification of access credentials, and so forth. The particular control actions 118 that are undertaken may be determined based on the extent to which the security score 216 exceeds the threshold security value. For example, if the security score 216 exceeds the threshold security value by a first amount, the control action 118 may include generation of a notification and new access credentials to replace previous access credentials. If the security score 216 exceeds the threshold security value by a second, greater amount, the request 102 may be rejected, a connection with the requesting device 104 may be terminated, and an identifier of the requesting device 104 may be added to a list of untrusted devices prohibited from accessing the system.

Figure 8:
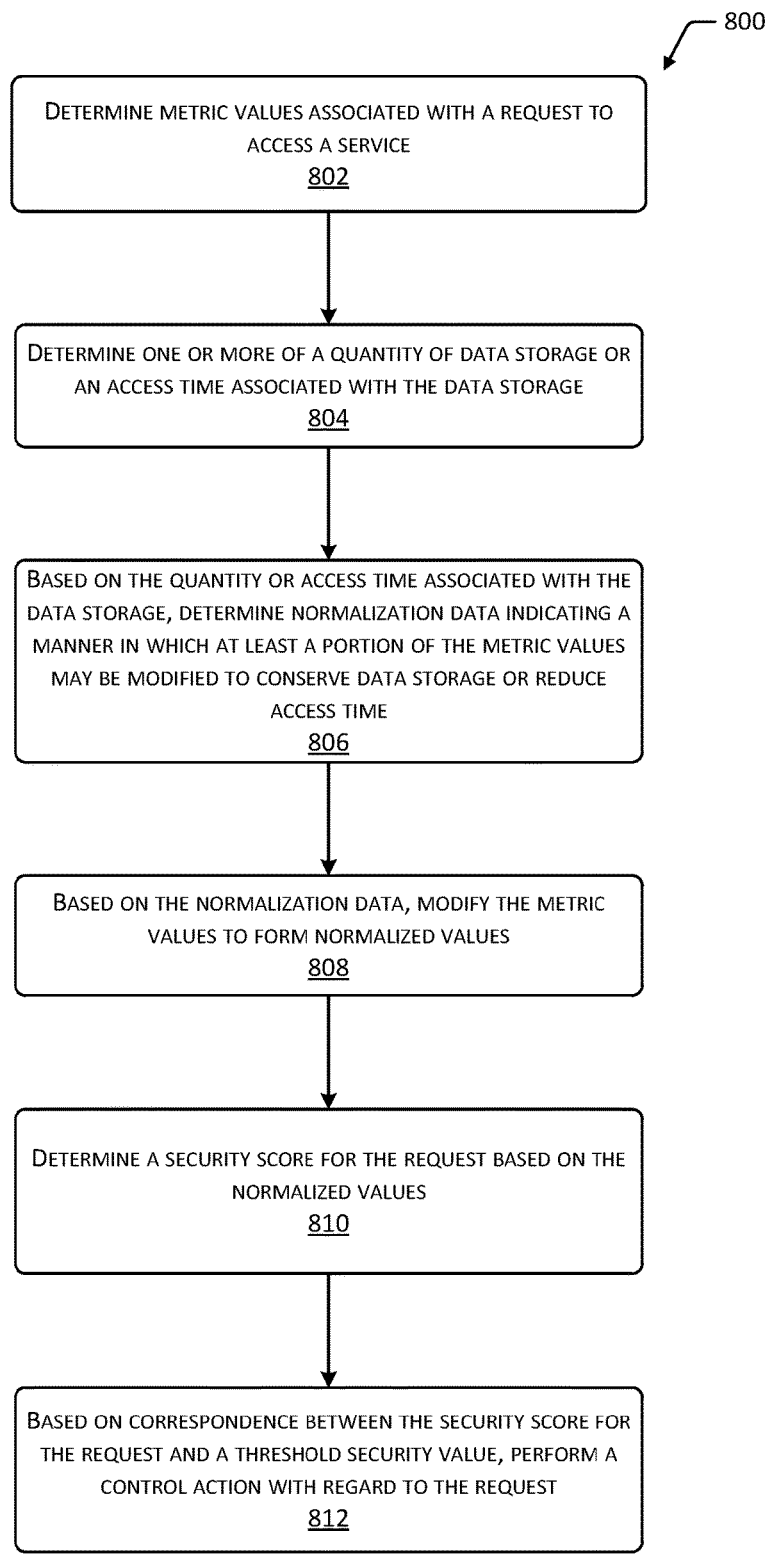
FIG. 8 is a flow diagram illustrating a method for normalizing metric values determined from a request based on quantities of data storage or access times to query the data storage.

FIG. 8 is a flow diagram 800 illustrating a method for normalizing metric values 202 determined from a request 102 based on quantities of data storage or access times to query the data storage. Block 802 determines metric values 202 associated with a request 102 to access a service. As described with regard to FIGS. 1-5, metric values 202 may include data indicative of one or more of a location of origin for a request 102, a user agent associated with the request 102, a network associated with the request 102, an entity targeted by the request 102, an operation to be caused by the request 102, and so forth.

Block 804 determines one or more of a quantity of data storage or an access time associated with the data storage. For example, one or more of the metric values 202 determined from a request 102, as well as associated metric data 126, may be stored in data storage for future access. Continuing the example, when determining whether a subsequent request 102 may be anomalous, metric values 202 of the subsequent request 102 may be used to query the data storage for metric values 202 that have been previously determined. However, the quantity of data storage used to store particular metric values 202, such as a large number of IP addresses, may be significant. Additionally, a large quantity of time and computing resources may be used to query a large number of IP addresses, resulting in an adverse user experience.

Block 806 determines normalization data 304, indicating a manner in which at least a portion of the metric values 202 may be modified to conserve data storage or reduce access time. In some implementations, the normalization data 304 may be determined based on the quantity or the access time associated with the data storage determined in block 804. For example, in some cases, normalization may be performed on the metric values 202 only if the access time exceeds a threshold time, if the quantity of data storage used to store the metric values 202 exceeds a threshold quantity, or if the quantity of data storage remaining for use is less than a threshold quantity. In other implementations, the normalization data 304 may be determined based on a number of records stored in a data storage medium. For example, if a number of records less than a threshold quantity is stored for a particular metric value 202, the metric data 126 may not be normalized. For example, a quantity of IP addresses less than a threshold quantity may be stored in the data storage medium without normalization. However, if the number of records stored in the data storage medium exceeds the threshold quantity, metric data 126 may be normalized in a first manner, such as by normalizing IP addresses to indicate a city of origin. Subsequently, if the number of normalized metric values 202 exceeds the threshold quantity, the metric data 126 may be normalized in a second manner, such as by normalizing the IP addresses to indicate a country of origin.

Block 808 modifies the metric values 202 to form normalized values 306 based on the normalization data 304. In some implementations, the normalization data 304 may indicate one or more portions of metric values 202 to be removed. For example, normalization of a metric value 202 indicating a particular user agent and version identifier may include removal of version information associated with the metric value 202. In other implementations, the normalization data 304 may indicate one or more mappings or conversions to perform on a metric value 202. For example, normalization of a metric value 202 indicating an IP address may include determining the country of origin associated with the IP address, then replacing the indication of the IP address with an indication of the country of origin. Different normalization schemes may be used depending on the access time or the quantity of data storage determined in block 806. For example, if the quantity of data storage used exceeds a first threshold quantity, the normalization data 304 may cause IP addresses to be normalized to reflect cities of origin. If the quantity of data storage used exceeds a second, greater threshold quantity, the normalization data 304 may cause IP addresses to be normalized to reflect countries of origin.

Block 810 determines a security score 216 for the request 102 based on the normalized values 306. As described with regard to FIGS. 1-4 and 7, an anomaly determination module 112 associated with the security server 110 may determine correspondence between the metric values 202 and one or more security thresholds 404. One or more security algorithms 402 may indicate the manner in which the security score 216 is determined, based on the security thresholds 404, the metric values 202, and the modified weights 124.

Block 812 performs a control action 118 with regard to the request 102, based on correspondence between the security score 216 and a threshold security value. The specific control action 118 taken may be based on whether the request 102 is determined to be anomalous or non-anomalous. In some implementations, the control action(s) 118 taken may be based on the extent to which the security score 216 deviates from the threshold security value, as described above.

Figure 9:
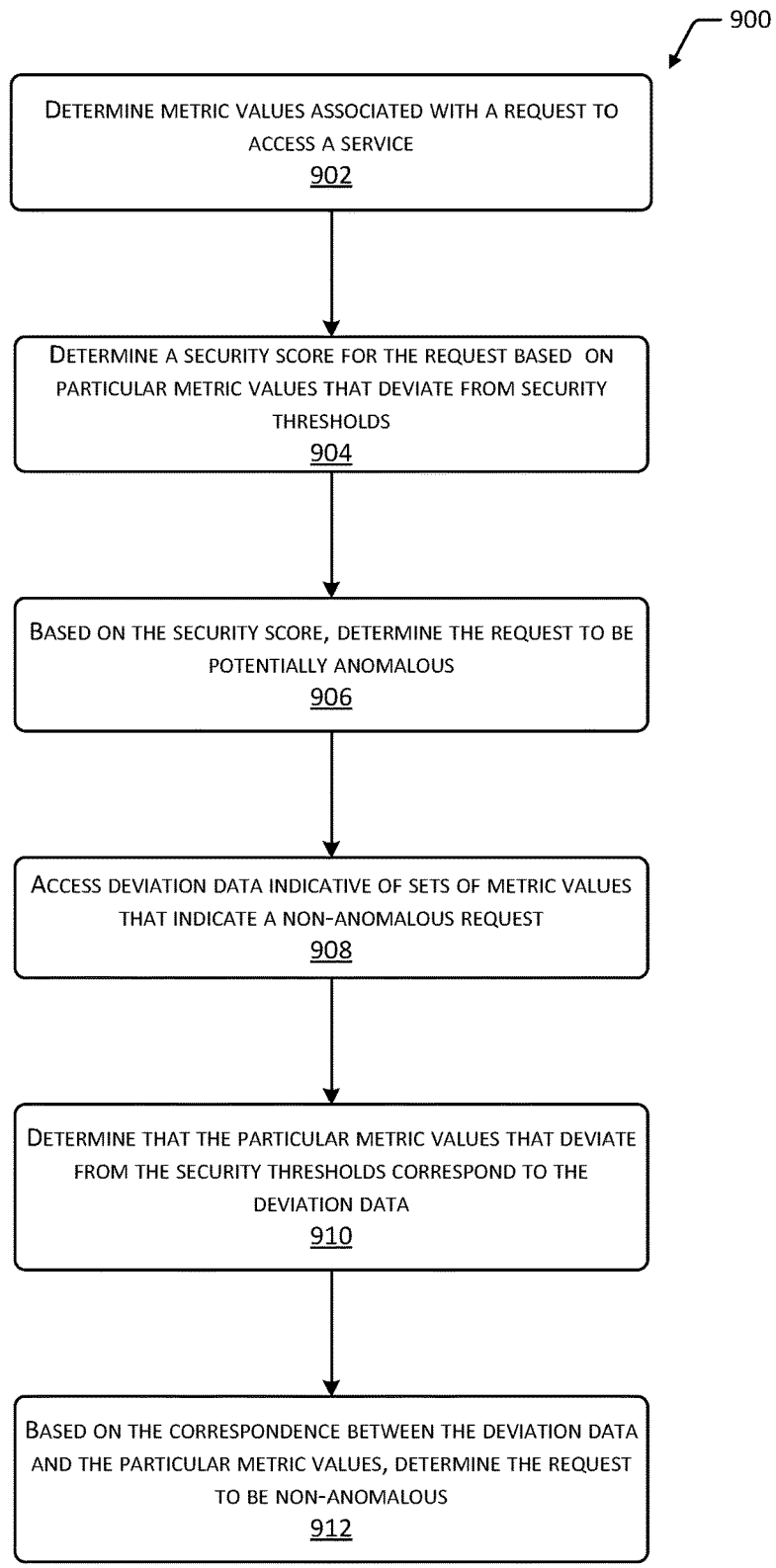
FIG. 9 is a flow diagram illustrating a method for determining non-anomalous requests based on deviation data indicating sets of non-anomalous metric values that differ from expected threshold values.

FIG. 9 is a flow diagram 900 illustrating a method for determining non-anomalous requests 102 based on deviation data 410 indicating sets of non-anomalous metric values 202 that differ from expected threshold metric values 202. Block 902 determines metric values 202 associated with a request 102 to access a service. As described with regard to FIGS. 1-5, metric values 202 may include data indicative of one or more of a location of origin for a request 102, a user agent associated with the request 102, a network associated with the request 102, an entity targeted by the request 102, an operation to be caused by the request 102, and so forth.

Block 904 determines a security score 216 for the request 102 based on particular metric values 202 that deviate from security thresholds 404. For example, security data 114 may include one or more security thresholds 404 that correspond to particular metric values 202. The security data 114 may also include one or more security algorithms 402 indicative of a manner in which a security score 216 may be determined based on the metric values 202 and the security thresholds 404.

Block 906 determines the request 102 to be potentially anomalous based on the security score 216. For example, a count of metric values 202 that deviate from security thresholds 404 may exceed a threshold count. As another example, the quantity by which one or more metric values 202 deviate from corresponding security thresholds 404 may exceed a threshold quantity. As yet another example, one or more metric values 202 may have a weight associated therewith, which may be used to determine the security score 216. In these examples, the security score 216 may deviate from a corresponding threshold value 116, which may indicate that the request 102 is potentially anomalous.

Block 908 accesses deviation data 410 indicative of sets of metric values 202 that may indicate a non-anomalous request 102. In some implementations, the deviation data 410 may be accessed responsive to a determination that the request 102 is potentially anomalous. In other implementations, the deviation data 410 may be accessed prior to determining the security score 216, which may result in the request 102 being determined as non-anomalous independent of the metric values 202 that deviate from the security thresholds 404. In still other implementations, correspondence between the deviation data 410 and particular metric values 202 may be used to affect the weight associated with the particular metric values 202. For example, if a set of metric values 202 corresponds to a value set 604 indicated by the deviation data 410, the weight associated with those metric values 202 may be reduced, set to zero, or set to a negative weight. Reduction of the weight associated with the set of metric values 202 may indicate a likelihood that the request 102 is non-anomalous.

Block 910 determines that the particular metric values 202 that deviate from the security thresholds 404 correspond to the deviation data 410. For example, if a particular set of metric values 202 each deviate from the security thresholds 404 in a manner previously associated with one or more non-anomalous requests 102, this may indicate that subsequent requests 102 having the same set of metric values 202 that deviate in the same manner may be non-anomalous. Block 912 determines the request 102 to be non-anomalous based on the correspondence between the deviation data 410 and the particular metric values 202.

Figure 10:
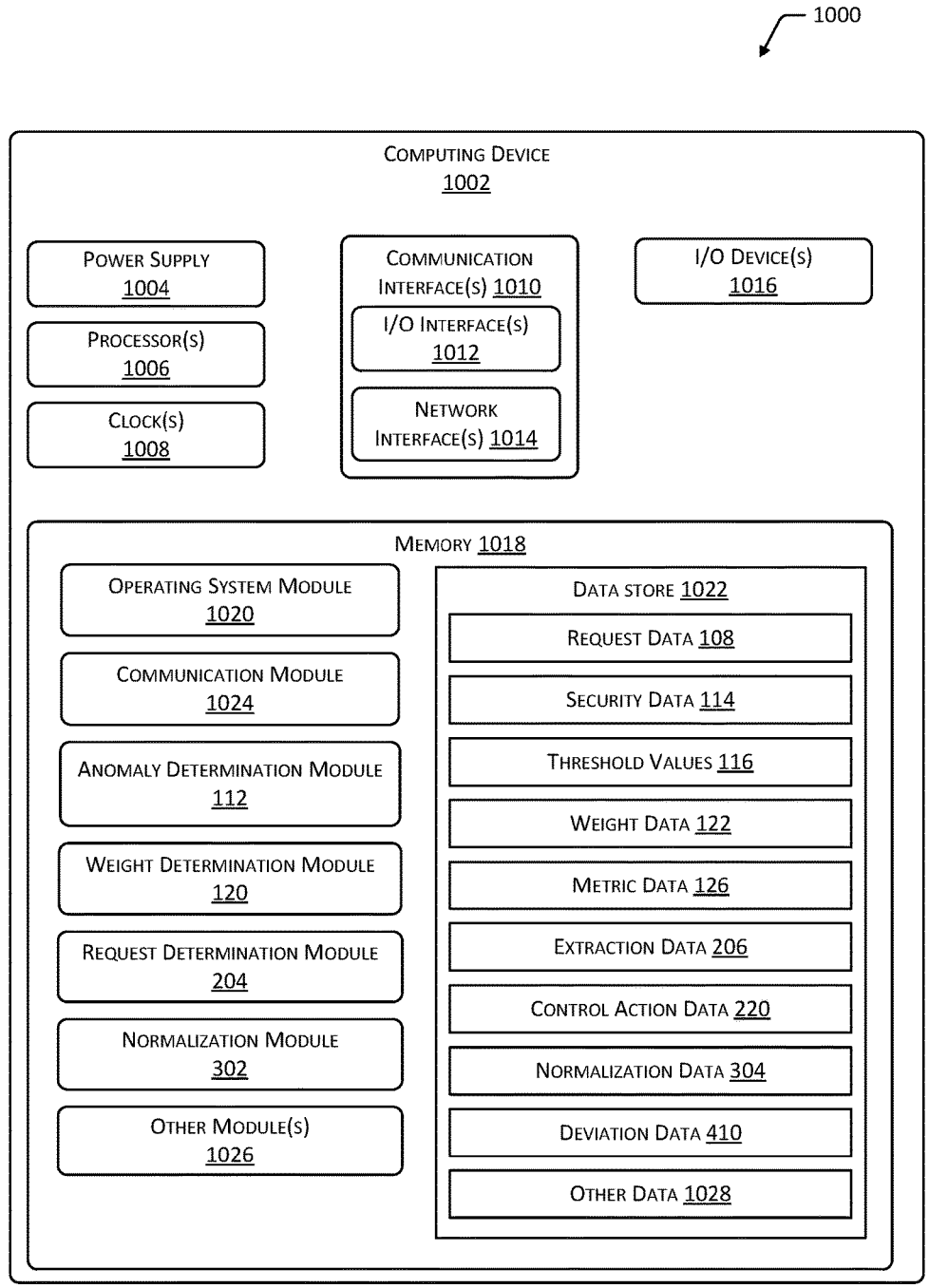
FIG. 10 is a block diagram depicting a computing device within the scope of the present disclosure.

FIG. 10 is a block diagram 1000 depicting a computing device 1002 within the scope of the present disclosure. The computing device 1002 may include one or more security servers 110, requesting devices 104, destination devices 106, or other computing devices 1002 in communication therewith. For example, while some implementations within the scope of the present disclosure may include one or more separate security servers 110, in other implementations, one or more functions described with regard to the security server(s) 110 may be performed by a requesting device 104, a destination device 106, or both.

One or more power supplies 1004 may be configured to provide electrical power suitable for operating the components of the computing device 1002. In some implementations, the power supply 1004 may include a rechargeable battery, fuel cell, photovoltaic cell, power conditioning circuitry, and so forth.

The computing device 1002 may include one or more hardware processor(s) 1006 (processors) configured to execute one or more stored instructions. The processor(s) 1006 may include one or more cores. One or more clocks 1008 may provide information indicative of date, time, ticks, and so forth. For example, the processor(s) 1006 may use data from the clock 1008 to generate a timestamp, trigger a preprogrammed action, and so forth. Continuing the example, data from the clock 1006 may be used to generate metric data 126 indicative of times when requests 102 associated with particular metric values 202 were received.

The computing device 1002 may include one or more communication interfaces 1010, such as input/output (I/O) interfaces 1012, network interfaces 1014, and so forth. The communication interfaces 1010 may enable the computing device 1002, or components of the computing device 1002, to communicate with other computing devices 1002 or components thereof. The I/O interfaces 1012 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 1012 may couple to one or more I/O devices 1016. The I/O devices 1016 may include any manner of input device or output device associated with the computing device 1002 or with another computing device 1002 in communication therewith. For example, I/O devices 1016 may include touch sensors, keyboards, mouse devices, microphones, image sensors (e.g., cameras), scanners, displays, speakers, haptic devices, printers, and so forth. In some implementations, the I/O devices 1016 may be physically incorporated with a computing device 1002 or may be externally placed.

The network interfaces 1014 may be configured to provide communications between the computing device 1002 and other devices, such as the I/O devices 1016, routers, access points, and so forth. The network interfaces 1014 may include devices configured to couple to one or more networks including local area networks (LANs), wireless LANs, wide area networks (WANs), wireless WANs, and so forth. For example, the network interfaces 1014 may include devices compatible with Ethernet, Wi-Fi, Bluetooth, ZigBee, Z-Wave, 3G, 4G, LTE, and so forth.

The computing device 1002 may include one or more busses or other internal communications hardware or software that allows for the transfer of data between the various modules and components of the computing device 1002.

As shown in FIG. 10, the computing device 1002 may include one or more memories 1018. The memory 1018 may include one or more computer-readable storage media (CRSM). The CRSM may be any one or more of an electronic storage medium, a magnetic storage medium, an optical storage medium, a quantum storage medium, a mechanical computer storage medium, and so forth. The memory 1018 may provide storage of computer-readable instructions, data structures, program modules, and other data for the operation of the computing device 1002. A few example modules are shown stored in the memory 1018, although the same functionality may alternatively be implemented in hardware, firmware, or as a system on a chip (SoC).

The memory 1018 may include one or more operating system (OS) modules 1020. The OS module 1020 may be configured to manage hardware resource devices such as the I/O interfaces 1012, the network interfaces 1014, the I/O devices 1016, and to provide various services to applications or modules executing on the processors 1006. The OS module 1020 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; and one or other operating systems.

A data store 1022 and one or more of the following modules may also be stored in the memory 1018. The modules may be executed as foreground applications, background tasks, daemons, and so forth. The data store 1022 may use a flat file, database, linked list, tree, executable code, script, or other data structure to store information. In some implementations, the data store 1022 or a portion of the data store 1022 may be distributed across one or more other devices including other computing devices 1002, network attached storage devices, and so forth.

A communication module 1024 may be configured to establish communications with requesting devices 104, destination devices 106, or one or more other computing devices 1002. The communications may be authenticated, encrypted, and so forth.

The memory 1018 may also store the anomaly determination module 112. The anomaly determination module 112 may determine a security score 216 associated with a request 102. The security score 216 may be determined based on the metric values 202 associated with the request 102 and the correspondence between those metric values 202 and one or more security thresholds 404 of the security data 114. The security score 216 may also be affected based on the modified weights 124 determined by the weight determination module 120. For example, one or more security algorithms 402 may indicate the manner in which a security score 216 is determined based on particular metric values 202, modified weights 124, and security thresholds 404.

The anomaly determination module 112 may also determine particular control actions 118 to be performed with regard to a request 102. In some implementations, the anomaly determination module 112 may determine one or more threshold values 116 based on previous security scores 216 determined within a particular time period. Based on the correspondence between the security score 216 for a particular request 102 and one or more threshold values 116, the control action 118 to be undertaken may be determined. For example, control action data 220 may associate one or more control actions 118 with particular threshold values 116. If a security score 216 meets, exceeds, fails to meet, or deviates from a particular threshold value 116 by a particular amount, the corresponding control action 118 may be undertaken responsive to the request 102.

In some implementations, the control action 118 determined by the anomaly determination module 112 may be affected by deviation data 410 indicative of value sets 604 of metric values 202 indicative of non-anomalous requests 102. For example, if an initial anomaly determination 406 indicates that a request 102 is potentially anomalous, but the metric values 202 associated with the request 102 correspond to a set of values indicated in the deviation data 410, this correspondence may indicate that the request 102 is non-anomalous. The control action 118 that is taken may be determined in part based on the correspondence between the deviation data 410 and the metric values 202 of the request 102.

The memory 1018 may also store the weight determination module 120. The weight determination module 120 may determine modified weights 124 to be used to calculate the security score 216 for a request 102. The modified weights 124 may be determined based on weight data 122 indicative of initial weight values 208 associated with particular metric values 202. In some implementations, weight data 122 may include weight algorithms 210 indicative of one or more rules, processes, and so forth, that may be used to determine a modified weight 124 for a metric value 202 based on the metric data 126 associated with that metric value 202. For example, the manner in which one or more metric values 202 deviate from a corresponding weight threshold 212 may determine the manner in which an initial weight value 208 is modified to determine a modified weight 124.

The memory 1018 may additionally store the request determination module 204. The request determination module 204 may be configured to determine particular metric values 202 based on request data 108 for a current request 102. For example, extraction data 206 may indicate particular metric values 202 to be determined, as well as metadata, algorithms, and so forth, that may indicate the manner in which particular metric values 202 may be determined from a request 102. In some implementations, at least a portion of the extraction data 206 may be determined based on user input. For example, a user may select particular metric values 202 of importance or particular metric values 202 believed to indicate a potential anomaly or security risk. In other implementations, at least a portion of the extraction data 206 may be determined based on previous metric values 202 that have caused a request 102 to be determined as anomalous or non-anomalous. For example, the metric values 202 indicated in the extraction data 206 may be selected based on the modified weights 124 associated with the metric values 202.

The memory 1018 may also include the normalization module 302. The normalization module 302 may modify one or more metric values 202 in a manner indicated by normalization data 304. In some implementations, the normalization module 302 may be configured to modify the metric values 202 responsive to a quantity of data storage used to store metric values 202 or a quantity of available data storage remaining. In other implementations, the normalization module 302 may be configured to modify the metric values 202 responsive to an access time to query the data storage exceeding a threshold time. Normalization data 304 may indicate the manner in which metric values 202 are to be modified. For example, normalization data 304 may include one or more mappings to convert particular metric values to other, more generalized formats. Continuing the example, a mapping may include a conversion between IP addresses and countries of origin.

Other modules 1026 may also be present in the memory 1018. For example, encryption modules may be used to encrypt and decrypt communications between computing devices 1002. The other modules 1026 may also include modules for logging request data 108 and metric values 202. Other modules 1026 may further include user input modules configured to provide user interfaces and receive user input responsive thereto. For example, user input modules may be used to determine user input associated with extraction data 206, normalization data 304, and so forth.

Other data 1028 within the data store 1022 may include user input data, such as configurations and settings associated with computing devices 1002. Other data 1028 may also include security data, such as encryption keys and schema, access credentials, and so forth.

In different implementations, different computing devices 1002 may have different capabilities or capacities. For example, security servers 110 may have significantly more processor 1006 capability and memory 1018 capacity compared to the processor 1006 capability and memory 1018 capacity of requesting devices 104 or destination devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors configured to execute the computer-executable instructions to:
   receive a request to access a service;
   determine at least one metric value associated with the request, the at least one metric value including one or more of:
   an origin location associated with the request;
   an identifier associated with the service;
   a user agent associated with the request;
   an identifier associated with an entity providing the request;
   an operation associated with the request; or
   an indication of a network associated with the request;
   access weight data indicative of a weight associated with the at least one metric value;
   determine a frequency of access associated with the at least one metric value;
   determine a time at which a previous access associated with the at least one metric value occurred;
   determine a count of accesses associated with the at least one metric value during a first time period;
   determine a ratio of the count of accesses to a total count of accesses associated with the service;
   modify the weight based on the frequency of access, the time at which the previous access occurred, the count of accesses, and the ratio to determine a modified weight;
   based on the modified weight for the at least one metric value, determine a security value associated with the request;
   based on one or more previous security values determined during a second time period, determine a threshold security value;
   determine correspondence between the security value associated with the request and the threshold security value, the correspondence indicating a likelihood of an anomaly associated with the request; and
   perform a control action based on the likelihood of the anomaly.

2. The system of claim 1, further comprising computer-executable instructions to:
   access normalization data associated with a particular metric value, the normalization data indicating one or more of:
   a portion of the particular metric value to be stored;
   a derived value to be determined from the particular metric value; or a mapping between the particular metric value and a mapped value to be determined from the particular metric value;
determine one or more of the portion, the derived value, or the mapped value based on the particular metric value; and
store the one or more of the portion, the derived value, or the mapped value in association with the request.

3. The system of claim 1, further comprising computer-executable instructions to:
access deviation data indicative of one or more sets of metric values associated with non-anomalous requests; and
determine correspondence between the at least one metric value and the deviation data, the correspondence indicating that the request is non-anomalous.

4. The system of claim 1, further comprising computer-executable instructions to:
access deviation data indicative of one or more sets of metric values associated with non-anomalous requests;
determine correspondence between the at least one metric value and the deviation data; and
decrease the modified weight for the at least one metric value based on the correspondence between the at least one metric value and the deviation data.

5. A method comprising:
determining a metric value associated with a request;
determining a weight associated with the metric value;
determining metric data including one or more of:
  a frequency of access associated with the metric value;
  a time at which a previous access associated with the metric value occurred;
  a count of accesses associated with the metric value; or
  a ratio of the count of accesses to a total count of accesses associated with a service targeted by the request;
based on the metric data, modifying the weight associated with the metric value to form a modified weight;
based on the modified weight and the metric value, determining a security value associated with the request, the security value indicating a likelihood of an anomaly associated with the request; and
performing a control action based on the security value.

6. The method of claim 5, further comprising:
determining one or more previous security values associated with a time period;
generating a threshold security value based on the one or more previous security values; and
determining correspondence between the security value and the threshold security value, the correspondence indicating the likelihood of the anomaly associated with the request;
wherein the control action is performed based on the correspondence.

7. The method of claim 5, further comprising:
accessing normalization data associated with the metric value, the normalization data indicating one or more normalized values to be determined based on the metric value; and
determining the one or more normalized values associated with the metric value.

8. The method of claim 7, further comprising:
determining one or more of:
  a quantity of data storage associated with a data storage medium for storing the metric value; or
  a time associated with searching the data storage medium to determine one or more particular metric values; and
generating the normalization data based on the one or more of the quantity of data storage or the time associated with searching the data storage medium.

9. The method of claim 5, wherein the metric value includes a network address associated with the request, and the network address is indicative of one or more of: a country of origin associated with the request, a region of origin associated with the request, a city of origin associated with the request, or a network service provider associated with the request, the method further comprising:
determining a time associated with searching a data storage medium to determine the one or more of the country of origin, the region of origin, the city of origin, or the network service provider;
generating normalization data based on the time associated with searching the data storage medium, the normalization data indicating a normalized value including one of: the country of origin, the region of origin, the city of origin, or the network service provider;
determining the normalized value based on the request; and
storing the normalized value in the data storage medium.

10. The method of claim 5, wherein the metric value includes a user agent associated with the request, and the user agent includes one or more of: a version, a name, or a type, the method further comprising:
determining a time associated with searching a data storage medium to determine the one or more of the version, the name, or the type;
generating normalization data based on the time associated with searching the data storage medium, the normalization data indicating a normalized value including one of: the version, the name, or the type;
determining the normalized value based on the request; and
storing the normalized value in the data storage medium.

11. The method of claim 5, further comprising:
determining at least one second metric value associated with the request, the metric value and the at least one second metric value defining a set of metric values;
accessing deviation data indicating one or more sets of metric values associated with one or more non-anomalous requests; and
determine correspondence between the deviation data and the set of metric values, the correspondence indicating that the request is non-anomalous;
wherein the control action includes one or more of: outputting an indication that the request is non-anomalous or storing the set of metric values as non-anomalous security values.

12. The method of claim 5, further comprising:
determining correspondence between the metric value and deviation data indicating one or more sets of metric values associated with one or more non-anomalous requests; and
based on the correspondence between the metric value and the deviation data, further modifying the weight.

13. A system comprising:
one or more memories storing computer-executable instructions; and
one or more hardware processors configured to execute the computer-executable instructions to:
  determine one or more metric values associated with a request;

determine metric data including one or more of:
- frequencies of access associated with the one or more metric values;
- counts of accesses associated with the one or more metric values; or
- ratios of the counts of accesses to total counts of accesses associated with a service targeted by the request;

determine, based at least in part on the metric data, one or more weights associated with the one or more metric values; and based on the one or more weights, determine a security value associated with the request;

determine first correspondence between the one or more metric values and one or more threshold values that include a threshold security value, the first correspondence indicating a set of metric values that deviate from the one or more threshold values and indicate a likelihood of an anomaly associated with the request;

in response to the first correspondence, access deviation data, wherein the deviation data indicates one or more sets of metric values that deviate from the one or more threshold values and were previously determined from non-anomalous requests;

determine second correspondence between at least one set of metric values of the deviation data and the set of metric values associated with the request, the second correspondence indicating a likelihood that the request is non-anomalous; and perform a control action associated with the request.

14. The system of claim 13, further comprising computer-executable instructions to:
modify the one or more weights based on the second correspondence between the deviation data and the one or more metric values.

15. The system of claim 13, further comprising computer-executable instructions to:
receive user input indicating initial weights associated with the one or more metric values, wherein the one or more weights are further determined based at least partly on the user input.

16. The system of claim 13, further comprising computer-executable instructions to:

access normalization data indicating a normalization scheme for at least a subset of the one or more metric values; and modify the at least a subset of the one or more metric values based on the normalization scheme;

wherein the one or more threshold values include normalized values.

17. The system of claim 16, wherein the normalization scheme includes one or more of:
- a Bloom filter indicating presence or absence of the one or more metric values; or
- a counting filter indicating a quantity associated with the one or more metric values.

18. The system of claim 16, further comprising computer-executable instructions to:
determine one or more of: a quantity of data storage associated with the one or more metric values or a time to determine a particular metric value from the data storage;

determine correspondence between the one or more of the quantity of data storage or the time to determine the particular metric value and one or more normalization thresholds; and generate the normalization data based on the correspondence.

19. The system of claim 16, further comprising computer-executable instructions to:
receive user input indicative of the normalization scheme, the user input mapping at least a subset of the one or more metric values to one or more normalized values; and generate the normalization data based at least in part on the user input.

20. The system of claim 13, further comprising computer-executable instructions to:
determine one or more previous security values associated with a time period; and generate the threshold security value based on the one or more previous security values;

wherein the first correspondence includes correspondence between the security value and the threshold security value.

* * * * *